(12) United States Patent
Mizrachi et al.

(10) Patent No.: US 7,953,093 B2
(45) Date of Patent: May 31, 2011

(54) TCP/IP REORDERING

(75) Inventors: Shay Mizrachi, Hod Hasharon (IL); Rafi Shalom, Ramat Gan (IL); Ron Grinfeld, Ramat Gan (IL)

(73) Assignee: Broadcom Corporation

( * ) Notice: Subject to any disclaimer, the term of this patent is extended or adjusted under 35 U.S.C. 154(b) by 2551 days.

(21) Appl. No.: 10/229,732

(22) Filed: Aug. 28, 2002

(65) Prior Publication Data

US 2003/0128704 A1 Jul. 10, 2003

Related U.S. Application Data

(60) Provisional application No. 60/317,647, filed on Sep. 6, 2001.

(51) Int. Cl.
*H04L 12/28* (2006.01)
(52) U.S. Cl. .......................... 370/394; 370/412; 370/474
(58) Field of Classification Search .................. 370/394, 370/412, 474
See application file for complete search history.

(56) References Cited

U.S. PATENT DOCUMENTS

| | | | |
|---|---|---|---|
| 5,222,061 A * | 6/1993 | Doshi et al. .................... | 370/394 |
| 5,440,545 A | 8/1995 | Buchholz et al. | |
| 5,493,667 A | 2/1996 | Huck et al. | |
| 5,809,527 A | 9/1998 | Cooper et al. | |
| 5,809,543 A | 9/1998 | Byers et al. | |
| 5,963,963 A | 10/1999 | Schmuck et al. | |
| 5,970,391 A | 10/1999 | Eaton et al. | |
| 6,157,955 A * | 12/2000 | Narad et al. .................... | 709/228 |
| 6,247,058 B1 * | 6/2001 | Miller et al. .................... | 709/234 |
| 6,438,655 B1 | 8/2002 | Nicol et al. | |
| 6,601,143 B1 | 7/2003 | Lamparter | |
| 6,631,130 B1 | 10/2003 | Roy et al. | |
| 6,643,710 B1 | 11/2003 | Thorne et al. | |
| 6,654,811 B1 | 11/2003 | Chaskar et al. | |
| 6,742,045 B1 | 5/2004 | Albert et al. | |
| 6,771,646 B1 | 8/2004 | Sarkissian et al. | |
| 6,795,866 B1 | 9/2004 | Mankude et al. | |
| 6,882,624 B1 * | 4/2005 | Ma ............................. | 370/236.1 |
| 6,907,042 B1 * | 6/2005 | Oguchi ......................... | 370/412 |
| 6,934,257 B2 * | 8/2005 | Liu et al. ....................... | 370/236 |
| 6,985,454 B1 * | 1/2006 | Wiedeman et al. ........... | 370/316 |

(Continued)

OTHER PUBLICATIONS

Postel, RFC 793 of the U.S. DARPA, entitled: "Transmission Control Protocol: DARPA Internet Program Protocol Specification" (1981).

(Continued)

*Primary Examiner* — Jung Park
(74) *Attorney, Agent, or Firm* — McAndrews, Held & Malloy, Ltd.

(57) ABSTRACT

A method for a receiver to perform processing of incoming data segments transmitted over a network by a transmitter in accordance with a transport protocol. The segments incorporate sequence values indicative of a transmission order of the segments. The method consists of receiving the data segments over the network in a reception order. Then, for each segment received in the reception order, the sequence values of the received segment and of the segments received earlier in the reception order are compared in order to assign the received segment a classification identity as an in-order or out-of-order segment.

The method further includes writing the segments, in a writing order that is substantially identical to the reception order, to respective locations in an output buffer responsive to the classification identity of each segment, so that the segments in the output buffer are arranged in the transmission order.

8 Claims, 17 Drawing Sheets

U.S. PATENT DOCUMENTS

2003/0031172 A1 * 2/2003 Grinfeld ................ 370/389

OTHER PUBLICATIONS

Jacobson, et al., "TCP extensions for high performance", in RFC 1323 of the Network Working Group, 1992.

Mathis, et al., TCP selective acknowledgment options, in RFC 2018 of the Network Working Group, 1996.

TCP/IP Illustrated, vol. 2, Section 27.9, by Wright & Stevens, Published by Addison-Wesley.

Office Action for U.S. Appl. No. 10/238,742, mailed on Nov. 4, 2005.

* cited by examiner

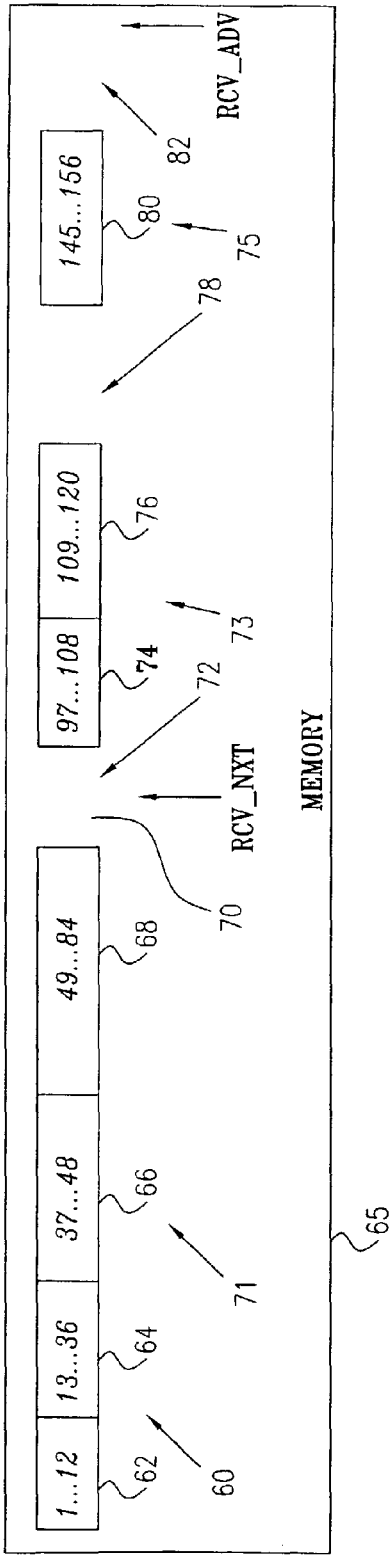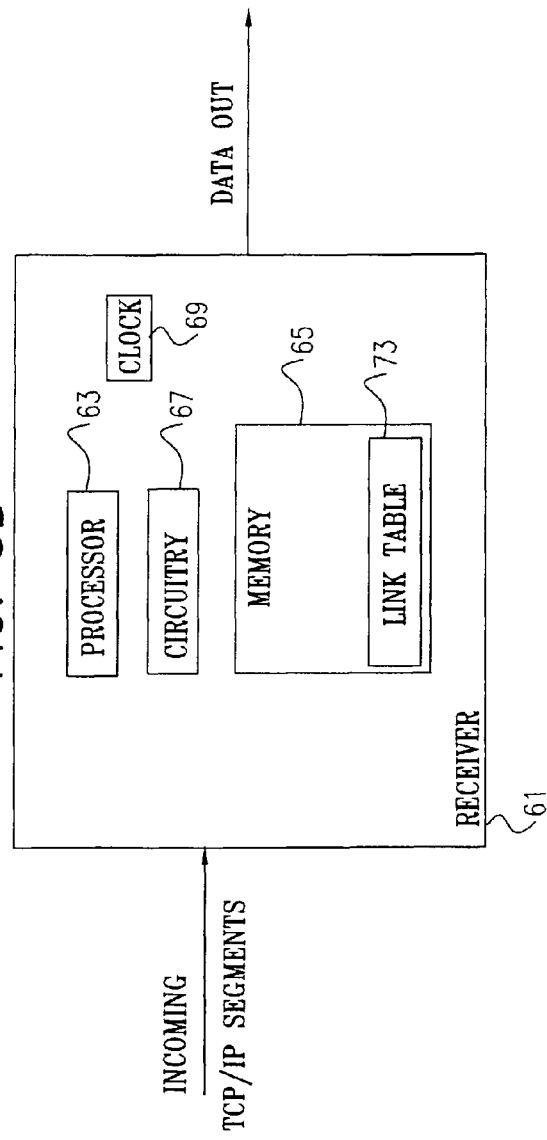

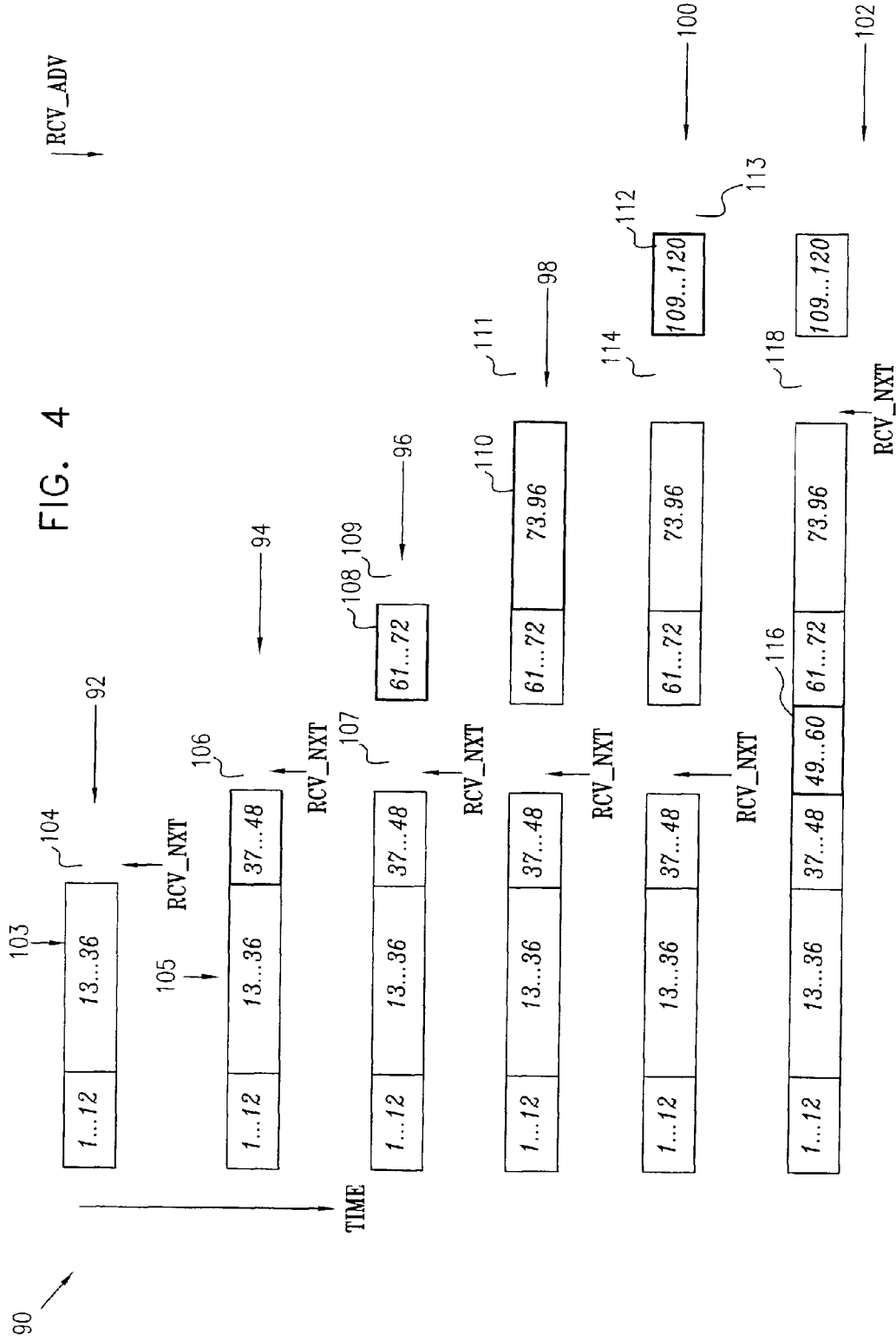

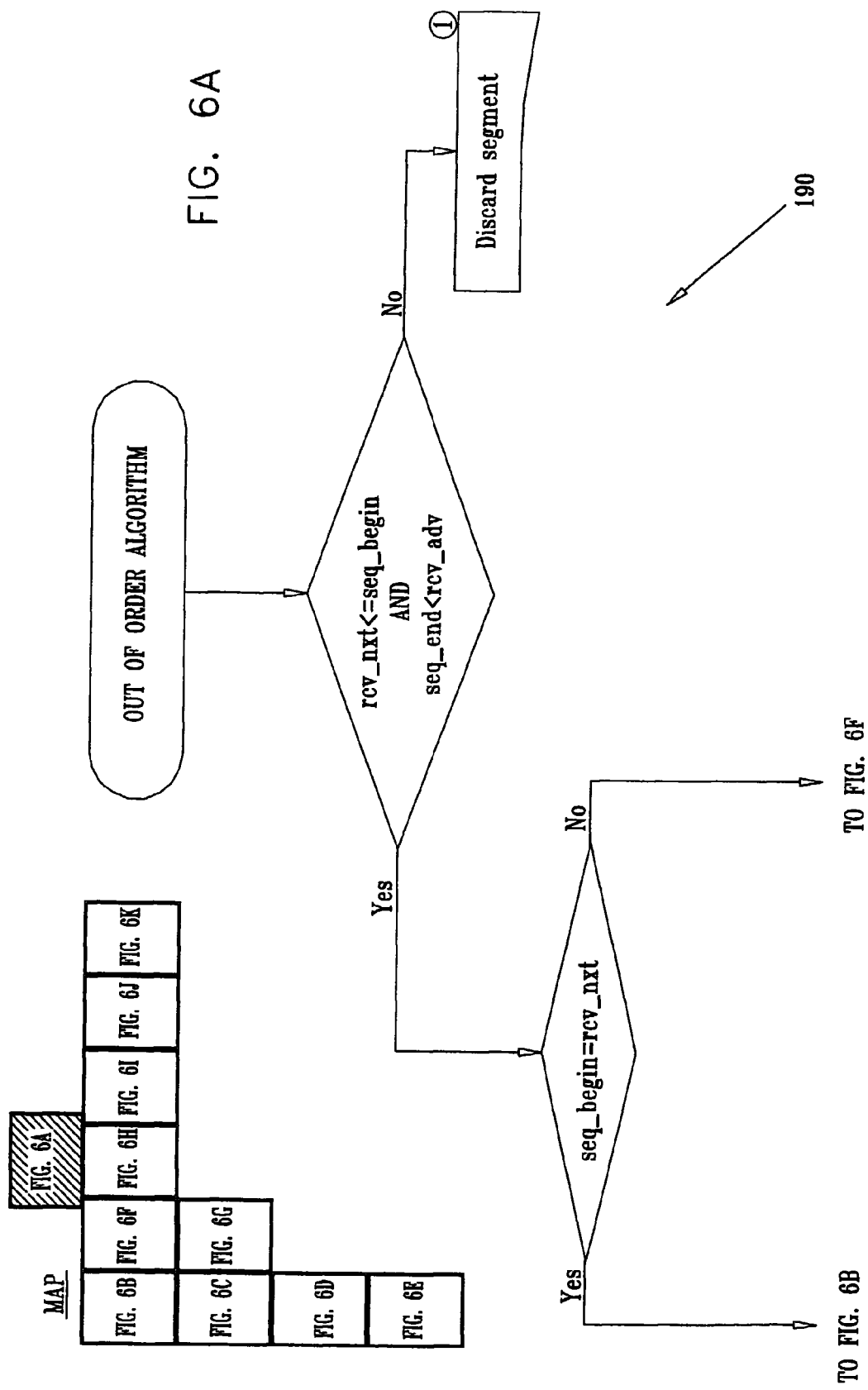

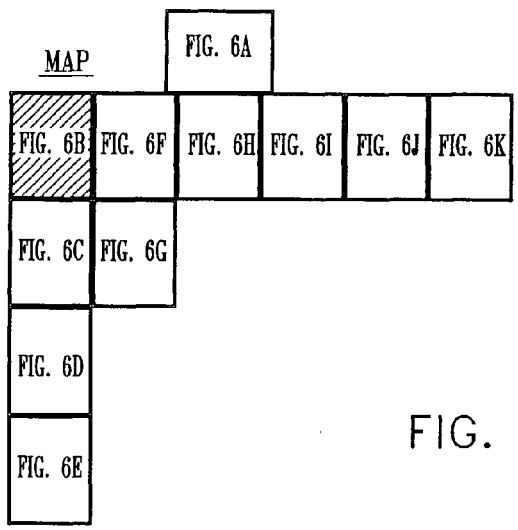
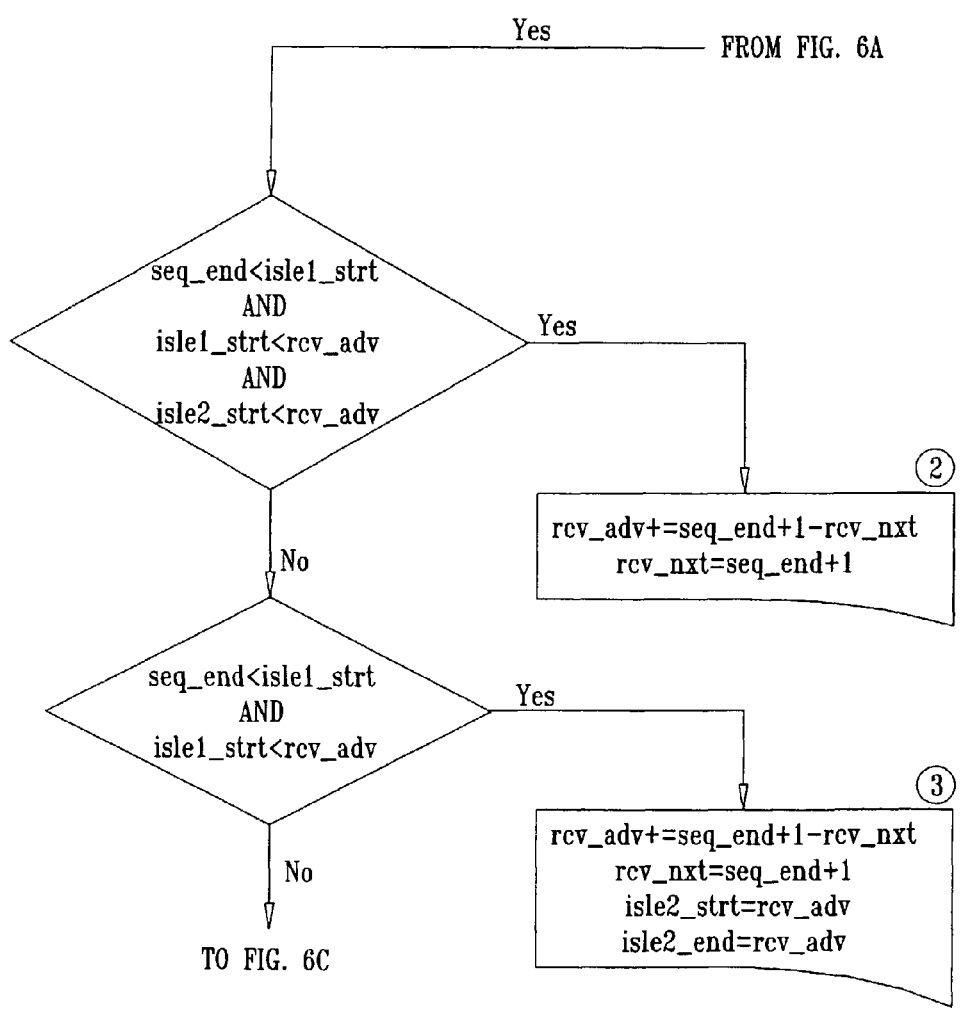
FIG. 6B

FIG. 6D
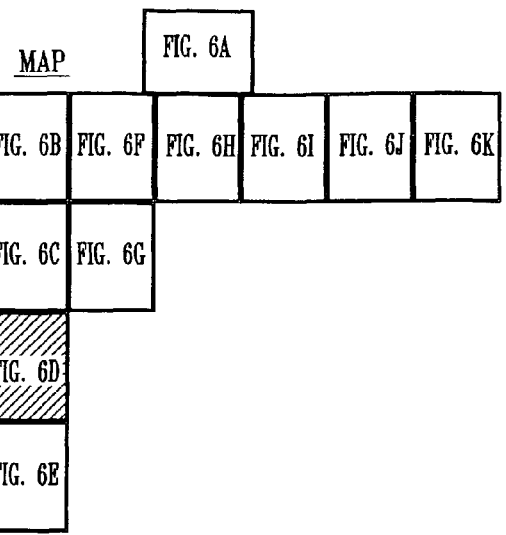
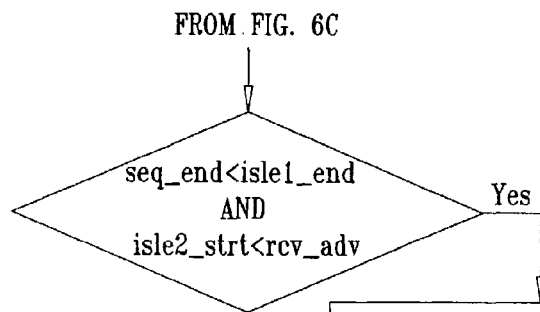

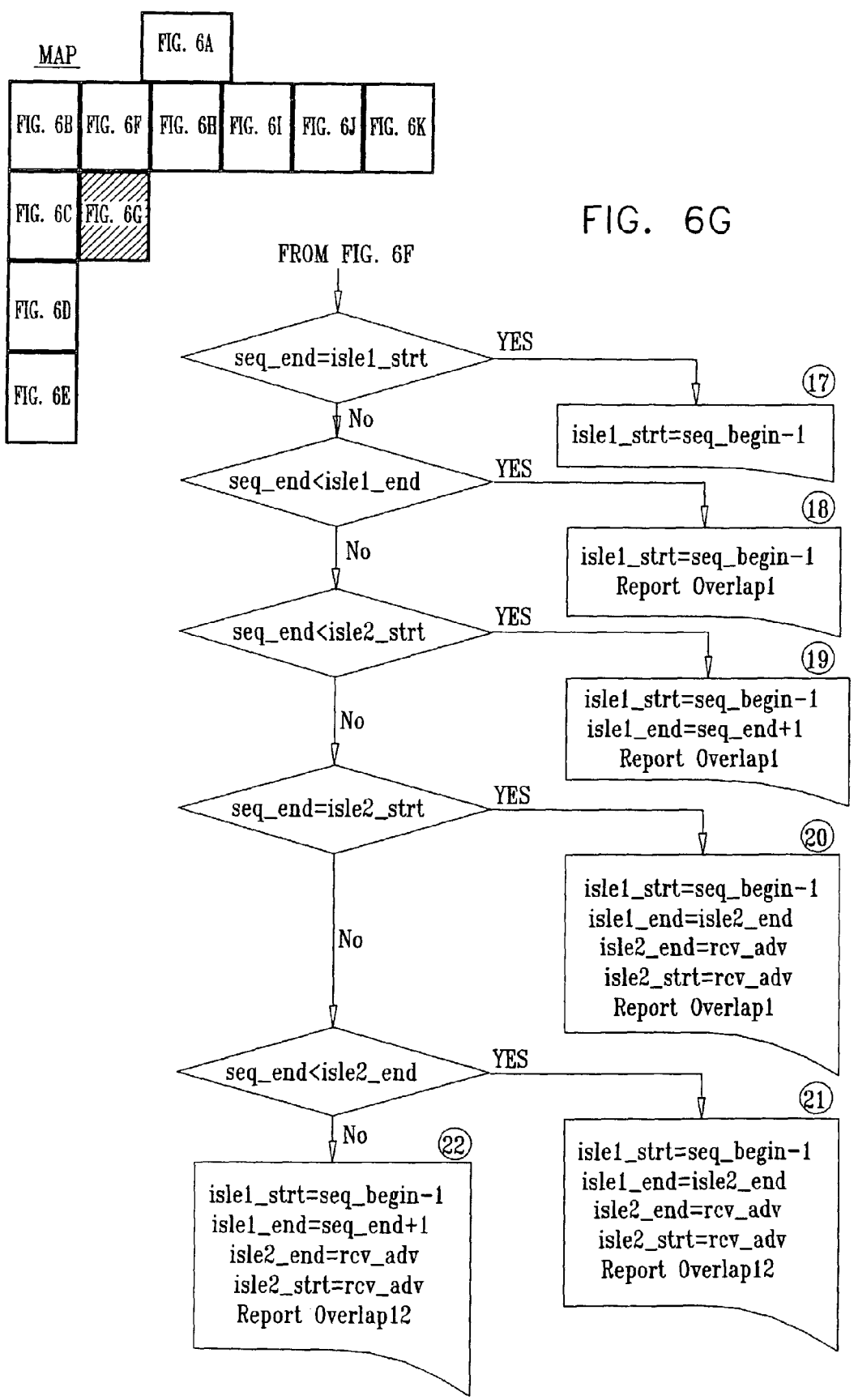

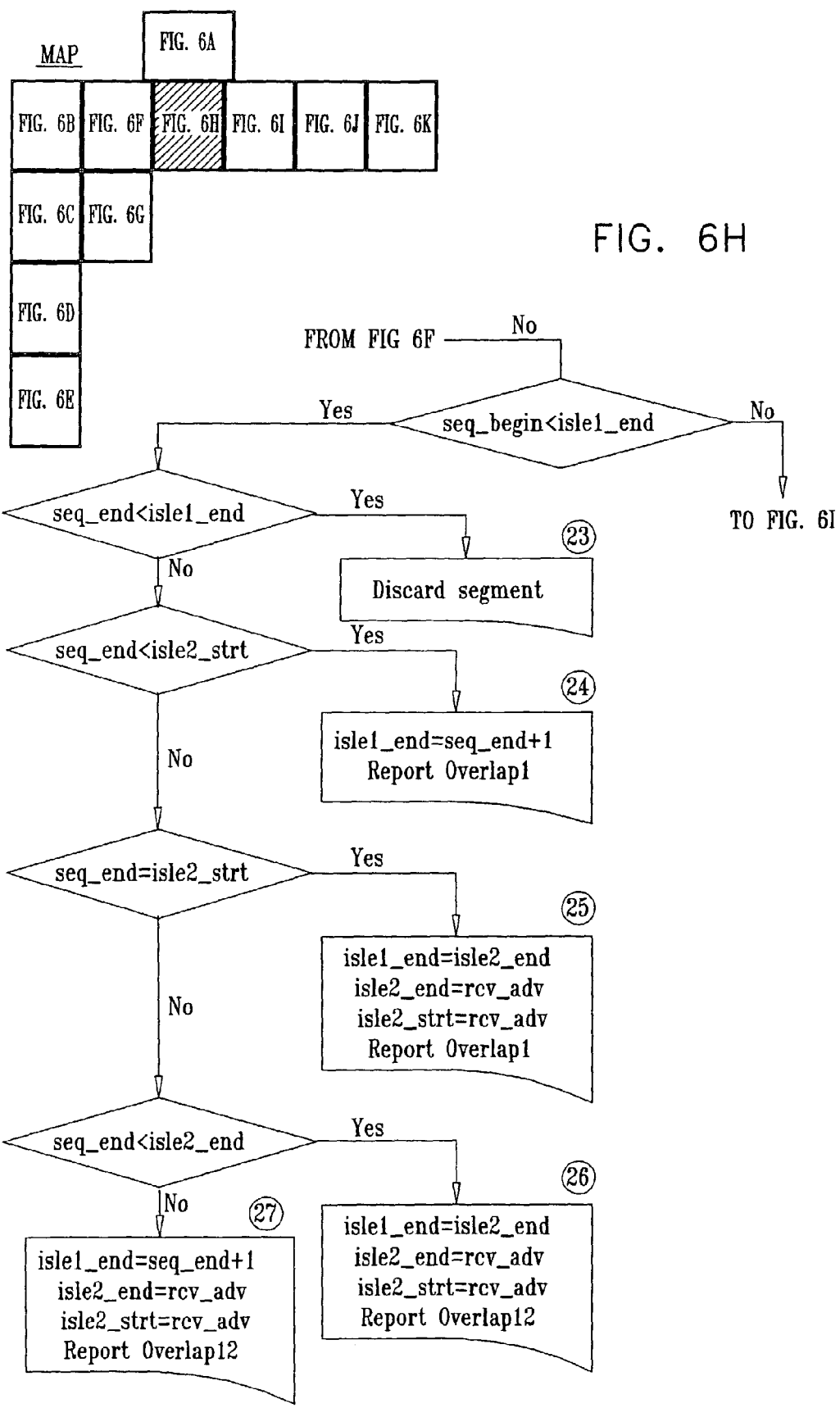

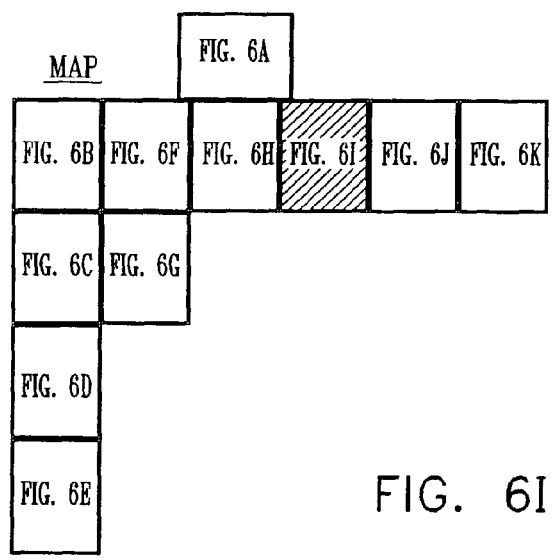
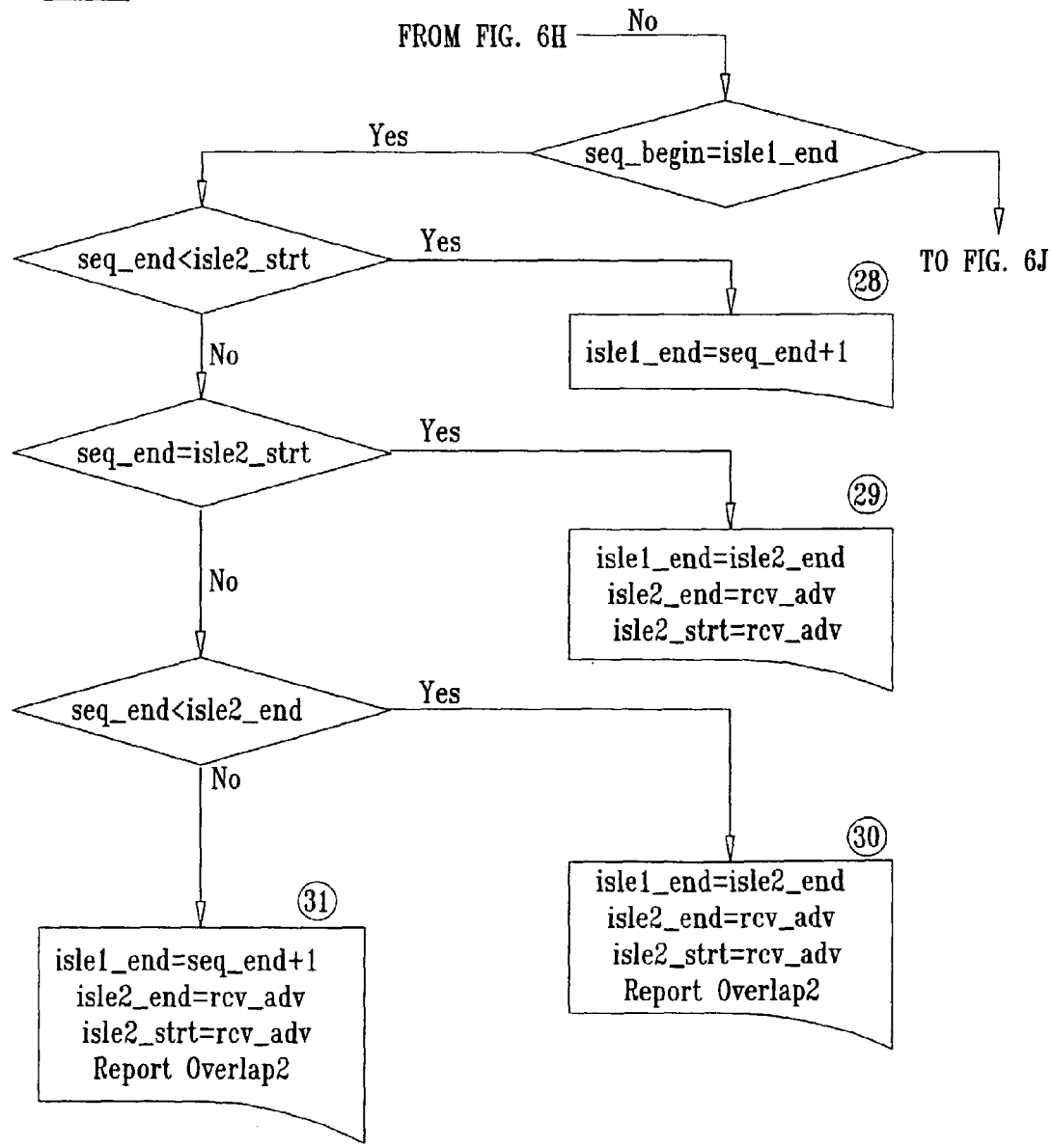
FIG. 6I

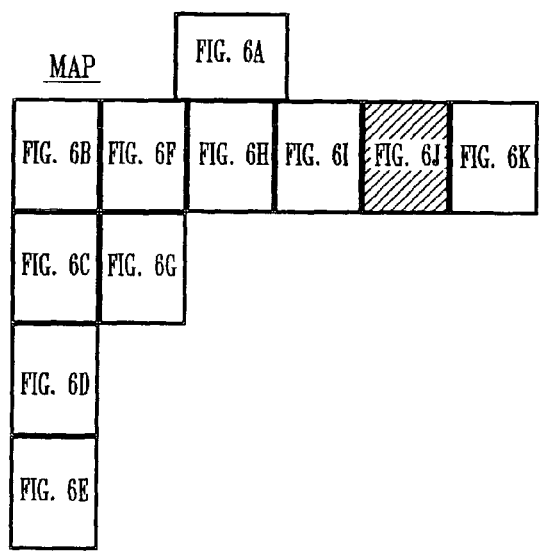
FIG. 6J
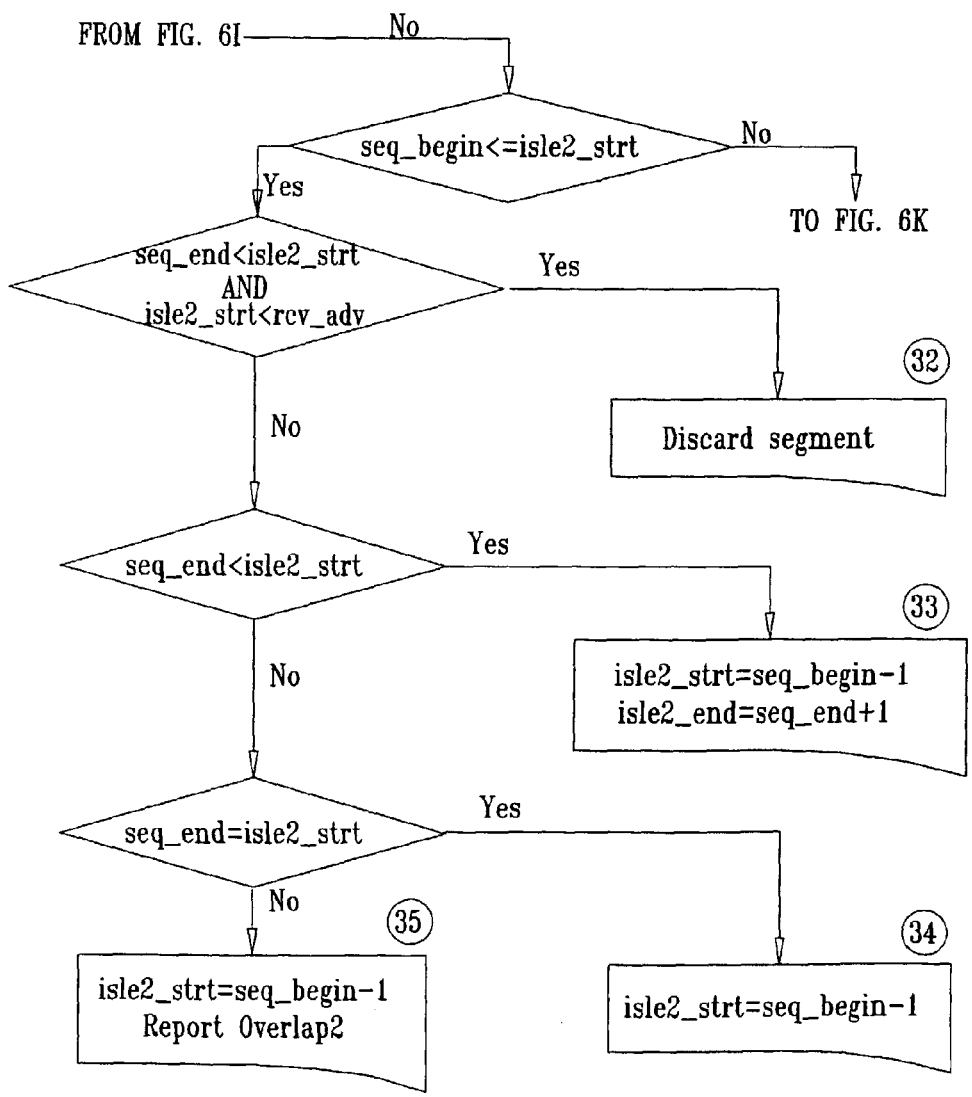

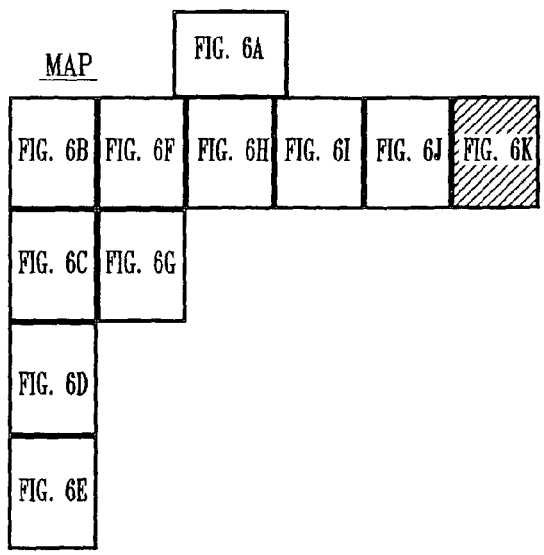
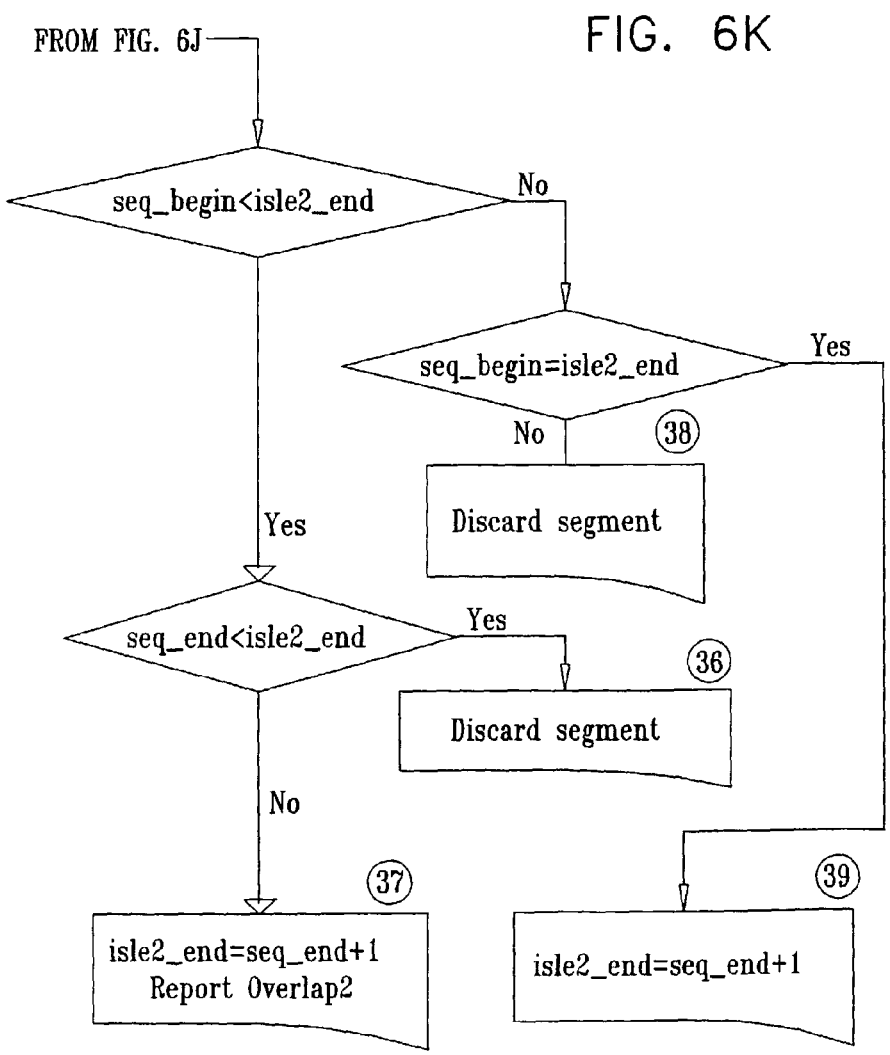
FIG. 6K

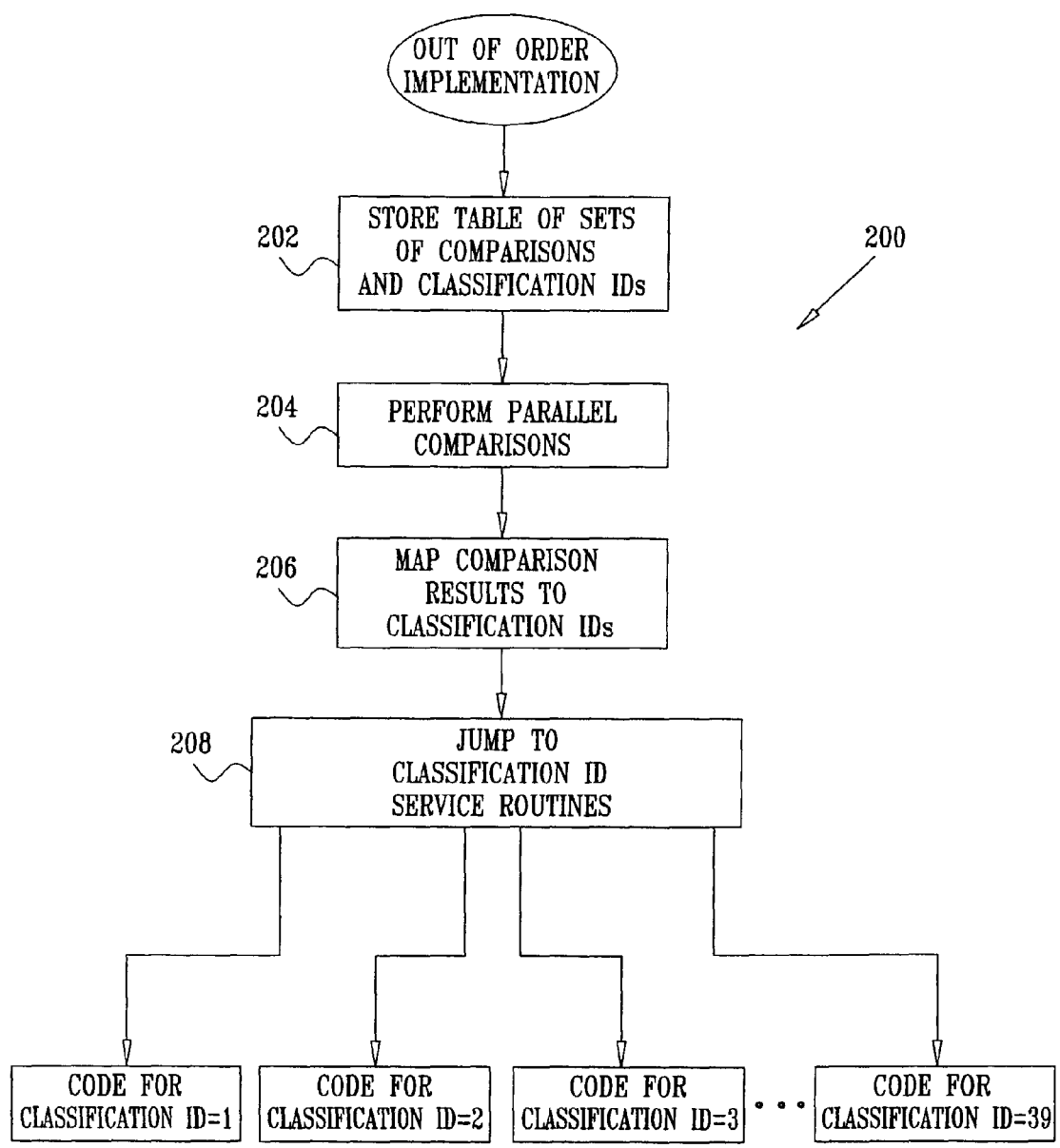

TCP/IP REORDERING

CROSS-REFERENCE TO RELATED APPLICATIONS

This application claims the benefit of U.S. Provisional Patent Application No. 60/317,647, filed Sep. 6, 2001, which is incorporated herein by reference.

FIELD OF THE INVENTION

The present invention relates generally to transmission of ordered sequences of data, and specifically to recovering disordered sequences.

BACKGROUND OF THE INVENTION

The Transmission Control Protocol/Internet Protocol (TCP/IP) suite is a widely-used transport protocol in digital packet networks. The TCP is described by Postel in RFC 793 of the U.S. Defense Advanced Research Projects Agency (DARPA), entitled "Transmission Control Protocol: DARPA Internet Program Protocol Specification" (1981), which is incorporated herein by reference. TCP is a connection-oriented, end-to-end, full-duplex protocol, which provides for reliable inter-process communication between pairs of processes in host computers. The information exchanged between TCP peers is packed into datagrams termed segments, each segment comprising a TCP header followed by payload data. The segments are transported over the network in IP packets.

FIG. 1 is a schematic block diagram depicting a structure of a Transmission Control Protocol (TCP) segment header 10, as is known in the art and specified in RFC 793. Header 10 begins with a source port 12 and a destination port 14, which are 16-bit identifiers respectively indicating the origin and intended destination of the TCP segment. As noted, the TCP is a connection-oriented protocol, signifying that messages are exchanged between two identified end-points which have an established connection.

A logical communication channel established between pairs of sockets is termed a connection. Connections are established after a three-way handshake process has completed successfully. An important element in the reliability of the TCP is the use of sequence numbers. Each octet (8 bits) of payload data transmitted is assigned a sequence number by the sending process. Payload data is indicated as a data field 40. The receiving process is required to acknowledge receipt of all octets received, by sending an acknowledgment (ACK) verifying the last sequence number successfully received. Sequence numbers provide a way for the sender to identify missing payload data requiring re-transmission, as well as a way for the receiver to order payload data which arrives out of sequence. Thus, a sequence number 16 contains a sequence number for a first octet of payload data in the TCP segment payload. If an ACK flag 24 is set, an acknowledgment number 18 contains the value of the next sequence number the sender of the acknowledgment segment is expecting to receive.

The TCP header contains six flags indicative of additional control information. A RST flag 28 indicates a request to reset the connection. A SYN flag 30 indicates that the segment is part of the three-way handshake process. A PSH flag 26 directs the receiving process to make transmitted data available immediately to the application level without waiting for a timeout or full buffer. A FIN flag 30 indicates that the sender has no more data to send.

A window field 34 contains a number of bytes beginning with the one indicated in the acknowledgment field which the sender of the segment is willing to accept. Field 34 thus advertises to a recipient of the segment an effective maximum number of bytes which the sender is prepared to receive.

An options field 37 provides a way to extend the original protocol while preserving compatibility with earlier implementations. The options field is used to synchronize various parameters during connection establishment, e.g., window scale and maximum segment size. In addition, the options field can convey information which is useful on an established connection, for example a Selective Acknowledgment (SACK) option and a timestamp (TS) option. The SACK option is described by Mathis, et al. in RFC 2018 of the Network Working Group, entitled "TCP Selective Acknowledgment Options" (1996), which is incorporated herein by reference. The SACK option supplements acknowledgment number 18 by providing a way to recover quickly from a single or consecutive set of missing segments by using an additional Acknowledgment number indicating segments received after the missing segments.

The TS option is described by Jacobson, et al. in RFC 1323 of the Network Working Group, entitled "TCP Extensions for High Performance" (1992), which is incorporated herein by reference. The TS option supplies a way to measure round-trip delivery times for segments, i.e., the time between the transmission of a segment and the receipt of an acknowledgment for the segment. This facility allows a TCP implementation to adapt acknowledgment timers to dynamic network behavior.

For the past twenty years, TCP/IP has been implemented as a software suite, typically as a part of computer operating systems. Within the TCP/IP software suite, the TCP receiver function is the largest logical task. A number of authors have suggested strategies for enhancing the performance of TCP receiver processing. However, software implementations of TCP receiver logic are limited by operating system performance constraints, as well as inefficiencies deriving from the serial nature of program execution in general-purpose microprocessors and associated overhead.

FIG. 2 is a flowchart showing processing of TCP/IP segments by a receiver, as is known in the art. A process substantially similar to that illustrated by the flowchart is described in section 27.9 of *TCP/IP Illustrated*, Volume 2, by Wright and Stevens, published by Addison-Wesley. The flowchart distinguishes in a first comparison 41 between two paths by which incoming segments are handled. Comparison 41 categorizes the incoming segment as an in-order segment, defined as having a start sequence value equal to the value of acknowledgment number 18 (FIG. 1). Otherwise the incoming segment is categorized as an out-of-order segment.

In a fast path 42, followed when condition 41 is true, data in an incoming segment is appended to already received data. Path 42 is only followed providing a queue buffer holding out-of-order segments is empty, the incoming segment is an in-order segment, and a connection has already been established. Path 42 comprises steps 47 wherein incoming statistics are updated and data comprised in the segment are appended to a receive buffer.

In a slow path 43, followed when condition 41 is false, a series of conditions 44, 45, and 46 are evaluated to see if data in the incoming segment is stored in a queue buffer, or if the data may be used to fill a "hole" in data which has already been stored in the queue buffer. Condition 44 checks to see if a connection already exists, and if not, establishes a connection and places the incoming segment data in the queue buffer. Condition 45 checks to see if the segment is an out-of-order segment, and if it is, places the incoming segment data in the queue buffer. Condition 46 checks to see if the segment fills a hole in data in the queue buffer. If it is, the data fills the hole; if it is not, the data is placed in the queue buffer.

As long as network speed was the main factor limiting receiver rates, software implementations of TCP receiver logic provided adequate performance levels. However, with the advent of network speeds in the Gbps and 10 Gbps range, this is no longer the case. Faster TCP receiver processing is required. In an attempt to release the resulting bottleneck, attention has turned to the development of a dedicated hardware implementation, or acceleration, of TCP/IP receiver logic. Optimizing a hardware implementation calls for a new approach to the original specification in RFC 793. Among the issues to be addressed are maximization of parallel processing, efficient information passing, and rapid classification and handling of segments.

SUMMARY OF THE INVENTION

It is an object of some aspects of the present invention to provide apparatus and a method for efficient reordering of segments transmitted according to a reliable transport protocol.

It is a further object of some aspects of the present invention to provide apparatus and a method for reordering of segments transmitted according to a Transmission Control Protocol/Internet Protocol (TCP/IP) protocol In preferred embodiments of the present invention, a process is provided for deciding an action to be taken by a receiver as an incoming segment, generated according to a reliable transport protocol transmitting segments incorporating sequence values, is received. In order to arrive at a final disposition of the incoming segment, the process makes a set of comparisons between start and end sequence values of the incoming segment and parameters derived from sequence values of segments received earlier in a segment reception order. Most preferably, the incoming and already received segments are generated according to a TCP/IP protocol.

The comparisons are performed in parallel in a first step by a processor implementing the process. The results of the set of comparisons are mapped to one of the possible dispositions of the process during a second process step, using a pre-stored mapping of sets of comparison results with possible classifications of the incoming segment. In a third process step, the final disposition of the segment comprises saving part or all of the segment, or discarding the segment. The final disposition most preferably also comprises writing one or more links to the saved segment into a link table responsive to the classification identity of the segment. The links arrange the saved segment (or part thereof), together with previously processed segments, into an initial transmission order of the segments. Alternatively, responsive to the classification identity, the saved segment or part thereof is written into a location in an output buffer so that the segment and previously processed segments are arranged into the initial transmission order.

Most preferably, each step of the process is performed within one clock cycle of a clock operating the processor. By performing the set of comparisons in parallel, and by mapping the results of the set to the final disposition, both in-order and out-of-order incoming segments can be processed, i.e., written to a final location, in a substantially identical manner and timeframe. Furthermore, a writing rate of the segments, in-order or out-of-order, is substantially identical to a reception rate of the segments. Thus, significant savings in time are achieved compared to methods for disposing of incoming segments known in the art.

In cases where there are gaps in sequence values of received segments, the process enables efficient filling of the gaps, as new segments are received. The process may be implemented to operate for virtually any number of gaps in the received segments, and enables efficient reordering of both incoming and already received segments.

There is therefore provided, according to a preferred embodiment of the present invention, a method for processing by a receiver of incoming data segments transmitted over a network by a transmitter in accordance with a transport protocol such that the segments incorporate sequence values indicative of a transmission order of the segments, the method including:

receiving the data segments over the network in a reception order;

for each segment received in the reception order, comparing the sequence values of the received segment and of the segments received earlier in the reception order in order to assign the received segment a classification identity as an in-order or out-of-order segment; and writing the segments, in a writing order that is substantially identical to the reception order, to respective locations in an output buffer responsive to the classification identity of each segment, so that the segments in the output buffer are arranged in the transmission order.

Preferably, comparing the sequence values of the received segment and of the segments received earlier in the reception order includes the steps of:

generating a pre-determined mapping between received-segment classification identities, including the classification identity, and expected sets of comparison results responsive to the sequence values;

determining received-segment comparison results responsive to the sequence values; and determining the classification identity responsive to the pre-determined mapping and the received-segment comparison results.

Preferably, the pre-determined mapping includes a one-to-one mapping.

Preferably, the method includes the step of providing a processor operated by a clock to implement the method, and wherein determining the received-segment comparison results consists of determining the results in a first time period determined by the clock, and determining the classification identity consists of determining the classification identity in a second time period determined by the clock, the second time period immediately following the first time period.

Preferably, the segments received earlier in the reception order include one or more out-of-order segments, and the method includes generating a pre-determined mapping between the classification identity and an expected set of comparison results responsive to the sequence values.

Preferably, the classification identity includes instructions responsive to the sequence values of the received segment and of the segments received earlier in the reception order, and writing the segments includes implementing the instructions so as to correctly locate the received segment in the output buffer.

Preferably, the transport protocol includes a Transmission Control Protocol/Internet Protocol (TCP/IP).

Preferably, writing the segments includes the step of writing one or more respective links pointing the segments to the respective locations in the output buffer.

Preferably, receiving the data segments includes receiving the data segments at a reception rate, and writing the segments includes writing the data segments at a writing rate substantially identical to the reception rate.

There is further provided, according to a preferred embodiment of the present invention, a receiver for processing incoming data segments transmitted over a network by a transmitter in accordance with a transport protocol such that the segments incorporate sequence values indicative of a transmission order of the segments, the receiver including:

a processor, which is adapted:

to receive the data segments over the network in a reception order, and for each segment received in the reception order, to compare the sequence values of the received segment and of the segments received earlier in the reception order in order to assign the received segment a classification identity as an in-order or out-of-order segment; and a memory, to which the processor writes the segments in a writing order that is substantially identical to the reception order and to respective locations in the memory responsive to the classification identity of each segment, so that the segments in the memory are arranged in the transmission order.

Preferably, the processor is adapted:

to generate a pre-determined mapping between received-segment classification identities, including the classification identity, and expected sets of comparison results responsive to the sequence values, and to store the mapping in the memory, to determine received-segment comparison results responsive to the sequence values, and to determine the classification identity responsive to the pre-determined mapping and the received-segment comparison results.

Preferably, the pre-determined mapping consists of a one-to-one mapping.

Preferably the receiver includes a clock which operates the processor, wherein the processor is adapted to determine the received-segment comparison results in a first time period determined by the clock, and to determine the classification identity in a second time period determined by the clock, the second time period immediately following the first time period.

Preferably, the segments received earlier in the reception order include one or more out-of-order segments.

Further preferably, the processor is adapted to generate a pre-determined mapping between the classification identity and an expected set of comparison results responsive to the sequence values.

Preferably, the classification identity includes instructions responsive to the sequence values of the received segment and of the segments received earlier in the reception order, and writing the segments includes implementing the instructions so as to correctly locate the received segment in the output buffer.

Preferably, the transport protocol includes a Transmission Control Protocol/Internet Protocol (TCP/IP).

Preferably, writing the segments includes writing one or more respective links pointing the segments to the respective locations in the memory.

The present invention will be more fully understood from the following detailed description of the preferred embodiments thereof, taken together with the drawings, in which:

BRIEF DESCRIPTION OF THE DRAWINGS

FIG. 3A is a schematic illustration of segments which have already been received at specific instances in time by a TCP/IP receiver, according to a preferred embodiment of the present invention;

FIG. 3B is a schematic diagram of the TCP/IP receiver, according to a preferred embodiment of the present invention;

FIG. 4 illustrates a possible scenario of incoming TCP/IP segments, according to a preferred embodiment of the present invention;

FIGS. 6A-6K represent a flowchart showing how an incoming TCP/IP segment is classified, according to a preferred embodiment of the present invention; and FIG. 7 is a flowchart showing how parallel comparisons are used in order to obtain classification identities shown in the flowchart of FIGS. 6A-6K, according to a preferred embodiment of the present invention.

DETAILED DESCRIPTION OF PREFERRED EMBODIMENTS

Figure 1:
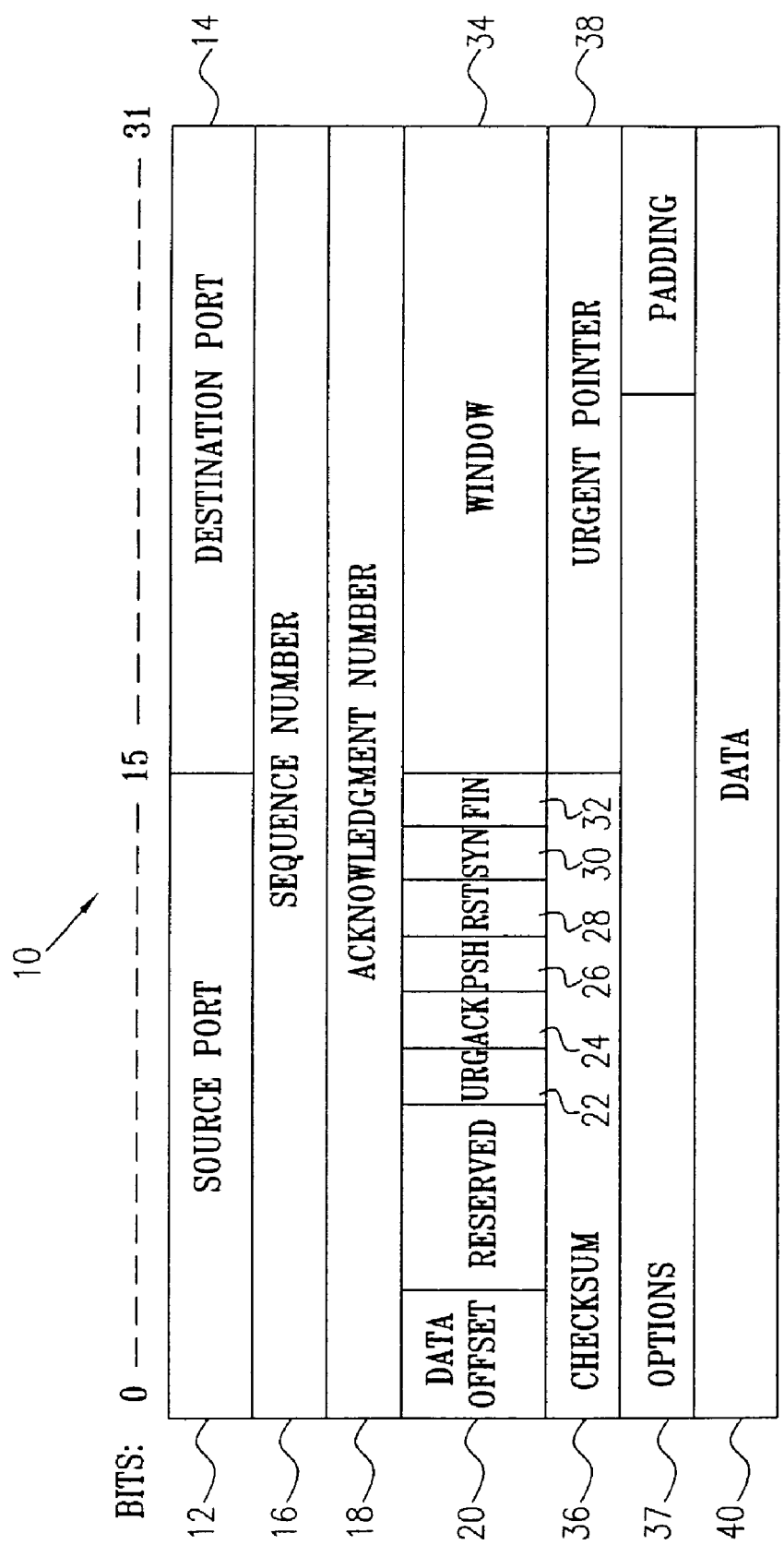
FIG. 1 is a schematic block diagram depicting structure of a Transmission Control Protocol/Internet Protocol (TCP/IP) segment header, as is known in the art.

Reference is now made to FIGS. 3A and 3B, which are respectively a schematic illustration of segments 60 which have already been received at specific instances in time by a receiver 61, and a schematic diagram of the receiver, according to a preferred embodiment of the present invention.

TCP/IP receiver 61 comprises a processor 63 coupled to a memory 65 and operated by a clock 69. Memory 65 stores incoming TCP/IP segments, each comprising a header and respective payload data, as they are received by receiver 61 in a reception order. The memory acts as both an input buffer and an output buffer for the payload data. For each segment, data derived from the header of the segment is processed by processor 63 and links to the payload data are written, in a writing order substantially identical to the reception order, to locations in memory 65 according to sequence values of the segments, as described hereinbelow. After processing, payload data comprised in the segments is forwarded by processor 63 to a final destination of the segments. Receiver 61 also comprises circuitry 67 which, together with parameters of received segments stored in memory 65, implements comparisons and code for processing a new incoming segment. The comparisons and code are described in detail with respect to FIGS. 4-7 below. Receiver 61 may be implemented by any process known in the art. Most preferably, receiver 61 is implemented in hardware using one or more application specific integrated circuits (ASICs). Alternatively or additionally, receiver 61 is implemented at least partly in software.

In memory 65, already received segments 60 consist of a first set of four Transmission Control Protocol/Internet Protocol (TCP/IP) segments 62, 64, 66, and 68 which have been separately received by TCP/IP receiver 61. Segment 62 comprises all sequences 1 through 12, with no missing sequences. It will be understood that the verification that there are no missing sequences is performed by the receiver, by methods known in the art, using sequence number 16 and acknowledgment number 18 (FIG. 1). Similarly, segments 64, 66, and 68 comprise sequences 13-36, 37-48, and 49-84 respectively. The receiver is also assumed to have received, at separate intervals, segments 74, 76, and 80, respectively comprising sequences 97-108, 109-120, and 145-156.

In the specification and in the claims, a continued datagram is assumed to be a continued set of one or more segments. If there is more than one segment, the term continued set is assumed to mean that segment boundaries are consecutive.

Thus in FIG. 3A there are three continued datagrams, a first continued datagram 71 consisting of four segments, and two other continued datagrams 73 and 75 consisting of two segments and one segment respectively. The sequence number after the highest segment of the first continued datagram is represented by rcv_nxt, so that in the example of FIG. 3A, rcv_nxt=85. Continued datagrams having sequence numbers greater than rcv_nxt are termed isles. Thus, datagram 73 and datagram 75 are isles.

A hole is the space between two consecutive continued datagrams. In segments 60, a first hole 72 is present after first continued datagram 71. rcv_nxt points to the beginning of first hole 72, and this relation is true for rcv_nxt and the beginning of any first hole. A second hole 78 exists between isles 73 and 75.

As described in the Background of the Invention, a TCP/IP transceiver advertises the size of data window it is prepared to receive using window field 34 (FIG. 1). Thus, there is a largest sequence number which the transceiver is able to receive. In the specification and in the claims, the term rcv_adv is assumed to be the largest sequence number plus 1.

Received segments 60 are assumed to be out-of-order when one or more holes are present in segments 60. The level of out-of-order is defined to be the number of holes present. In FIG. 3A, an out-of-order level two exists.

FIG. 4 illustrates a possible scenario 90 of incoming segments, according to a preferred embodiment of the present invention. Scenario 90 shows segments at six instances 92, 94, 96, 98, 100, and 102 in time. At time 92 two segments have already arrived, forming a first continued datagram 103 with sequence numbers from 1 to 36, and having a sequence number rcv_nxt=37. Also, the receiver has advertised its ability to receive data sequences so that rcv_adv is some large value, assumed by way of example to be greater than 120. Scenario 90 illustrates segments arriving where there are no repeated sequences, i.e., none of the segments overlap.

At time 94 an incoming segment having initial sequence number 37 arrives. The incoming segment is termed an in-order incoming segment, since its initial sequence number is equal to rcv_nxt. This segment is added to datagram 103 to form a new first continued datagram 105 ending with sequence number 48, so that rcv_nxt becomes 49.

At time 96 an incoming segment 108 is received, and since start sequence number 61 of the segment does not equal rcv_nxt, the segment is termed an out-of-order segment. The segment forms a first isle, having sequence numbers from 61 to 72, and creates a first hole 107.

At time 98 a segment 110 is received, having a start sequence number 73, which is one greater than the end sequence number 72 of the first isle. Segment 110 is thus concatenated with segment 108, enlarging the first isle so that the last sequence number of the first isle becomes 96. Segment 110 is an out-of-order segment.

At a time 100 a segment 112 is received. A start sequence number 109 of segment 112 is greater than the end sequence number of the enlarged first isle, so that segment 112 forms a second isle having sequence numbers from 109 to 120. Segment 112 is an out-of-order segments.

At a time 102 a segment 116 is received. Segment 116 has a first sequence value 49, which is equal to the value of rcv_nxt, so that segment 116 is an in-order segment. Segment 116 has a last sequence number 60, and so just fills first hole 107, so that all sequences from 1 to 96 form a first continued datagram, and rcv_nxt moves to the end of this datagram, i.e., rcv_nxt=97.

Figure 5:
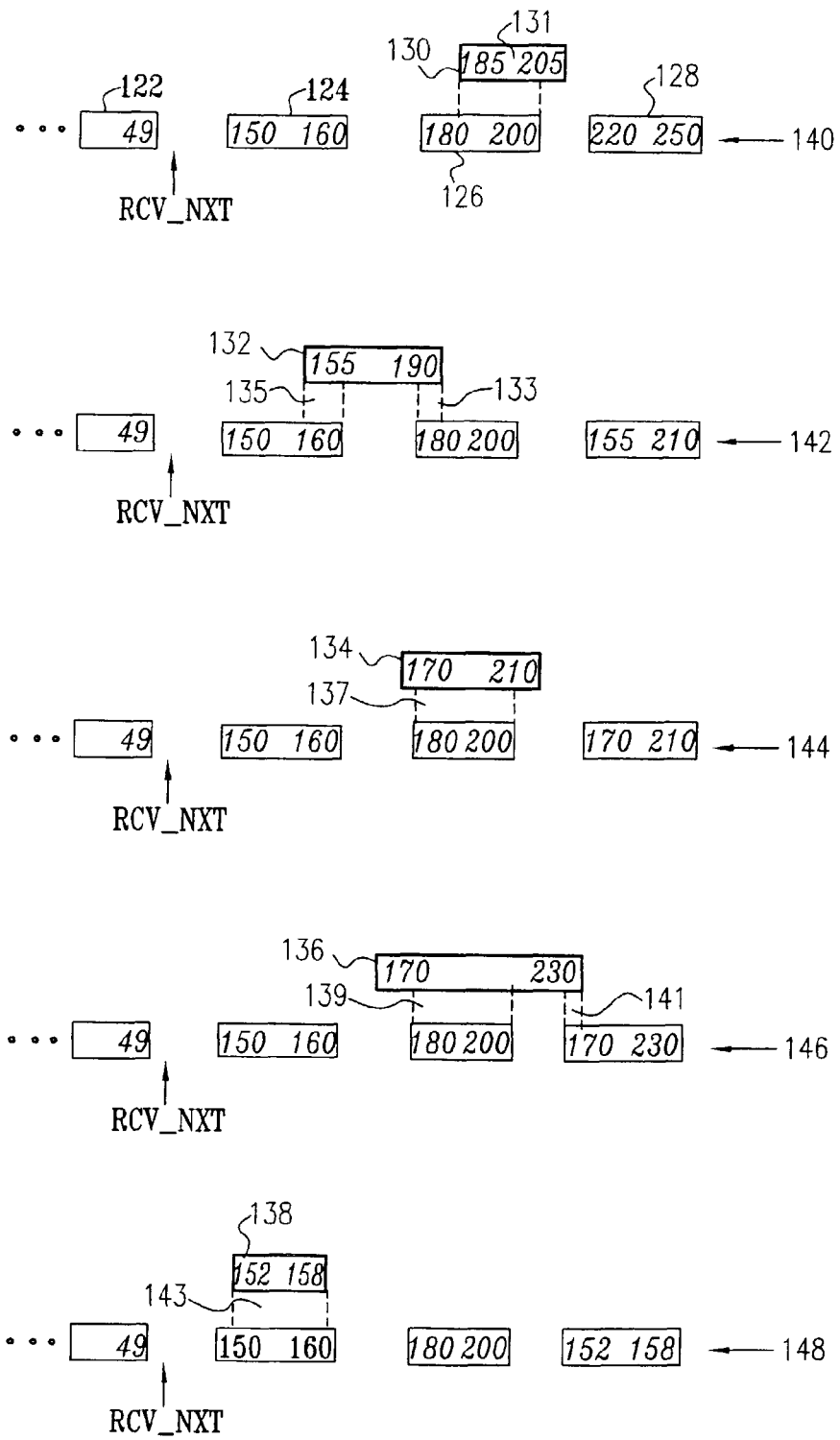
FIG. 5 illustrates scenarios of incoming out-of-order TCP/IP segments when overlap occurs, according to a preferred embodiment of the present invention.
Figure 6C:
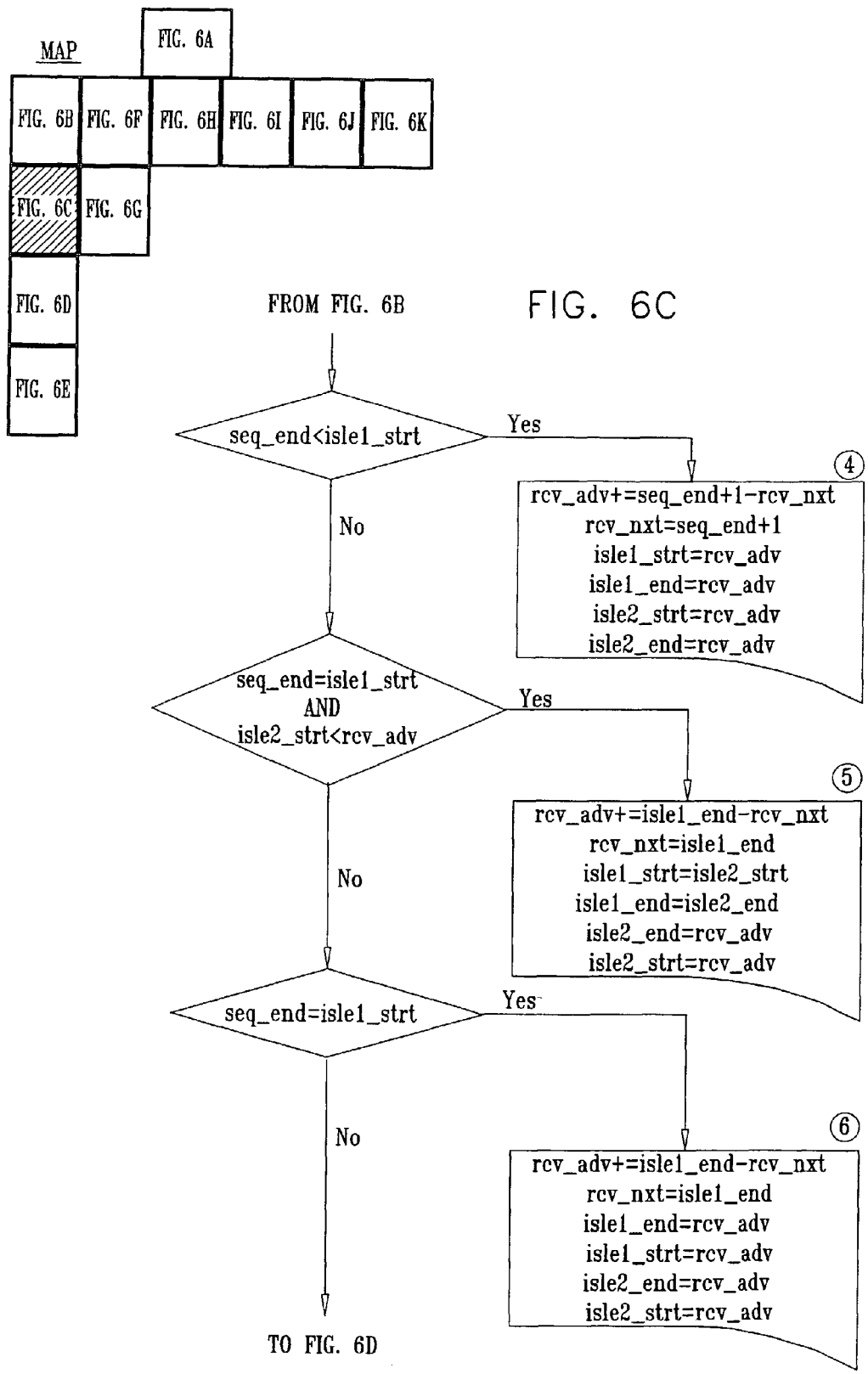
Figure 6E:
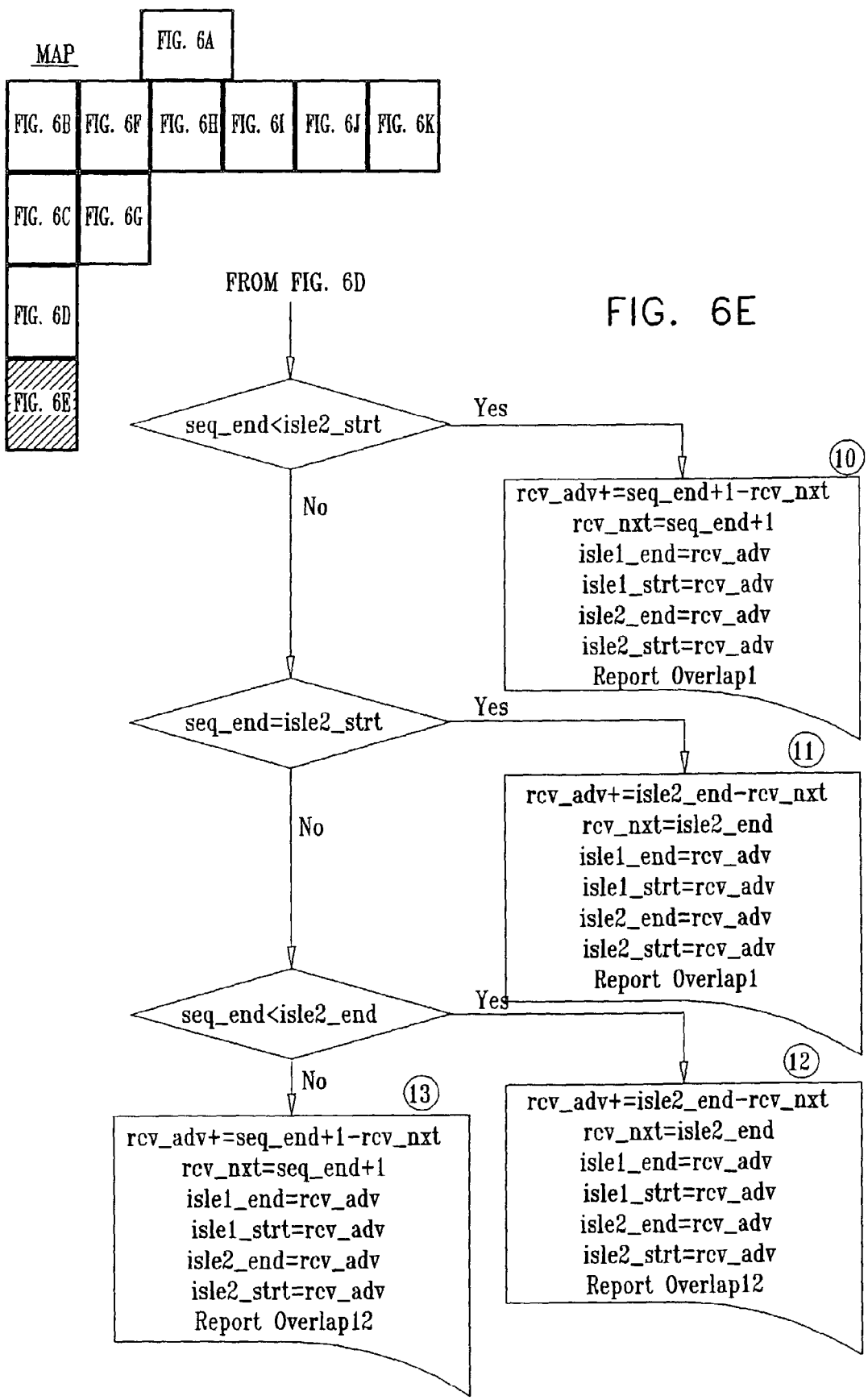
Figure 6F:
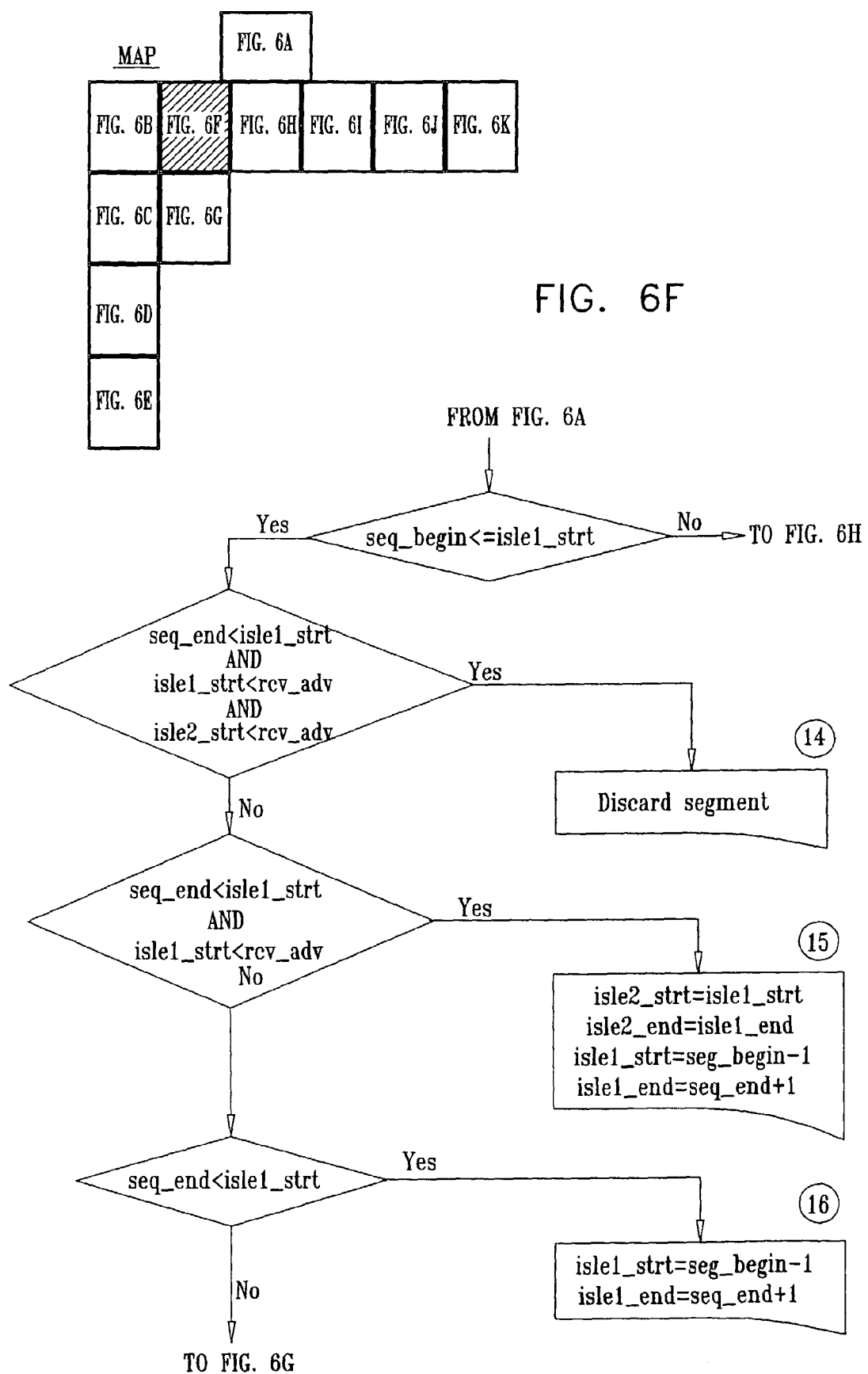

FIG. 5 illustrates scenarios of incoming out-of-order segments when overlap occurs, according to a preferred embodiment of the present invention. In all scenarios 140, 142, 144, 146, 148 there is assumed to be a first continued datagram 122 having a last sequence number 49, a first isle 124 having sequence numbers from 150 to 160, a second isle 126 having sequence numbers from 180 to 200, and a third isle 128 having sequence numbers from 220 to 250.

In scenario 140, some of the sequence numbers in an incoming datagram 130 having sequence numbers from 185 to 205 overlap, at a "left region" 131 of datagram 130, with already received sequence numbers in second isle 126. An overlap where part or all of second isle 126 is overlapped is termed an overlap 2. In general, an overlap x is an overlap where part or all of isles listed in x are overlapped.

In scenario 142 there is an incoming datagram 132 having sequence numbers from 155 to 190. By inspection of scenario 142 it will be apparent that an overlap 12 occurs. It will be understood that where overlap occurs, as exemplified by the scenarios of FIG. 5, at least part of the incoming segment comprises redundant sequences. The results of all scenarios of FIG. 5 are given in Table I below.

TABLE I

| Scenario | Overlap | Results |
| --- | --- | --- |
| 140 | Overlap 2. | Left section 131 of incoming segment 130 redundant. Second isle enlarged. |
| 142 | Overlap 12. | Left and right sections 135, 133, of incoming segment 132 redundant. First and second isles coalesce to be the first isle. Third isle 123 becomes second isle. |
| 144 | Overlap 2. | Central section of incoming segment 134 redundant. Second isle enlarged. |
| 146 | Overlap 23. | Right and central sections, 141, 139, of incoming segment 136 redundant. Second and third isles coalesce to be the second isle. |
| 148 | Overlap 1. | No change in isles. Incoming segment 138 is redundant since all sequences in segment are already present in first isle. No change in isles. |

As described in more detail below, with respect to FIGS. 6A-6K, redundant sections of any incoming segment are not required for assembly of the complete datagram, and are discarded.

The selective acknowledgment (SACK) option enables up to four isles to be stored, as described in the Background of the Invention. However, it will be apparent that other TCP/IP embodiments may enable more than four isles to be maintained. Preferred embodiments of the present invention are able to operate with substantially any number of isles that are stored by TCP/IP receiver 61. For clarity, the description below assumes that up to two isles may be present, and those skilled in the art will be able to adapt the description for cases when more than two isles may be present.

At any instance in time, TCP/IP receiver 61 stores in memory 65 values of reception parameters defined in table II below:

TABLE II

| Reception Parameter | Reception Parameter Definition |
|---|---|
| rcv_nxt | Sequence number following the last sequence number of the first continued datagram. |
| rcv_adv | Largest acceptable sequence number plus 1. |
| isle1_strt | First isle start sequence number minus 1. |
| isle1_end | First isle end sequence number plus 1. |
| isle2_strt | Second isle start sequence number minus 1. |
| isle2_end | Second isle end sequence number plus 1. |

When an isle is not present, parameters associated with the isle are set to be equal to rcv_adv. For example, this will be the case at the beginning of a receiving session, when there are no isles. At the beginning of the receiving session, rcv_nxt is set equal to 1.

Reception parameters in table II are used to classify an incoming segment, and TCP/IP receiver 61 implements code according to the classification that has been made.

FIGS. 6A-6K illustrate a flowchart 190 showing how an incoming TCP/IP segment is classified, according to a preferred embodiment of the present invention. The classification is made according to the initial sequence number, seq_begin, and final sequence number, seq_end, of the incoming segment, and how these segment parameters compare with reception parameters stored in Table II in receiver 61. In the case of up to two isles, there are a total of 39 possible classifications, and each classification is assigned an identity ID1, . . . , ID39. Flowchart 190 lists the respective code and/or other action, (e.g., discard the segment, report overlap x) that TCP/IP receiver 61 implements in order to process the segment, for each classification ID1, . . . , ID39. Flowchart 190 shows each identity ID1, . . . , ID39 as a number enclosed in a circle.

Classification ID1, wherein the incoming segment is discarded, applies when one of seq_begin or seq_end is outside receiver 61 parameters. Table III below lists classification properties when the incoming segment is an in-order segment.

TABLE III

| ID | Classification Property |
|---|---|
| ID2 | Segment partially fills first hole. Isle 1 and Isle 2 present. |
| ID3 | Segment partially fills first hole. Isle 1 present. |
| ID4 | Segment concatenates with existing datagram. No isles present. |
| ID5 | Segment exactly fills first hole. Isle 1 and Isle 2 initially present, reducing to one isle after segment arrival. |
| ID6 | Segment exactly fills first hole. Isle 1 initially present, no isles after segment arrival. |
| ID7 | Segment fills first hole and overlaps isle 1. Isle 1 and Isle 2 initially present, reducing to one isle after segment arrival. Overlap 1. |
| ID8 | Segment fills first hole and overlaps isle 1. Isle 1 initially present, no isles after segment arrival. Overlap 1. |
| ID9 | Segment fills first hole and part of second hole. Isle 1 and isle 2 initially present, reducing to one isle after segment arrival. Overlap 1. |
| ID10 | Segment fills first hole and completely overlaps isle 1. Isle 1 initially present, no isles after segment arrival. Overlap 1. |
| ID11 | Segment fills first hole and second hole exactly. Isle 1 and isle 2 initially present, no isles after segment arrival. Overlap 1. |
| ID12 | Segment fills first and second holes, and partially overlaps isle 2. Isle 1 and isle 2 initially |

TABLE III-continued

| ID | Classification Property |
|---|---|
|  | present, no isles after segment arrival. Overlap 12. |
| ID13 | Segment fills first and second holes, and completely overlaps isle 2. Isle 1 and isle 2 initially present, no isles after segment arrival. Overlap 12. |

Since incoming segments in Table III are in-order segments, code implemented for each of the classifications in Table III includes incrementing rcv_adv. Incrementing rcv_adv maintains a size of the receiving window (corresponding to window field 34, FIG. 1) substantially constant. Other reception parameters listed in Table II are updated, as shown in the respective code for each classification, according to the properties described in Table III.

For example, an incoming in-order segment corresponding to classification TD9 causes rcv_adv to be incremented so that the receive window begins from seq_end of the incoming segment. Also, rcv_nxt moves to the end of the incoming segment, parameters for isle 1 are taken from what was isle 1, and parameters for isle 2 are set to rcv_adv, since there is only one isle remaining.

Table IV below lists classification properties when the incoming segment is an out-of-order segment.

TABLE IV

| ID | Classification Property |
|---|---|
| ID14 | Segment discarded. A third isle would begenerated in the first hole. Isle 1 and Isle 2 initially present. |
| ID15 | Segment partially fills first hole, generating second isle. Isle 1 initially present. |
| ID16 | Segment generates first isle. |
| ID17 | Segment partially fills first hole and joins to isle 1. Isle 1 initially present. No change in number of isles. |
| ID18 | Segment partially fills first hole and overlaps isle 1. Isle 1 initially present. No change in number of isles. Overlap 1. |
| ID19 | Segment partially fills first and second holes and completely overlaps isle 1. Isle 1 and isle 2 initially present. No change in number of isles. Overlap 1. |
| ID20 | Segment partially fills first hole, exactly fills second hole, and completely overlaps isle 1. Isle 1 and isle 2 initially present, reducing to one isle after segment arrival. Overlap 1. |
| ID21 | Segment partially fills first hole, exactly fills second hole, and partially overlaps isle 2. Isle 1 and isle 2 initially present, reducing to one isle after segment arrival. Overlap 12. |
| ID22 | Segment partially fills first hole, exactly fills second hole, and completely overlaps isle 2. Isle 1 and isle 2 initially present, reducing to one isle after segment arrival. Overlap 12. |
| ID23 | Segment discarded. Segment overlaps isle 1. Isle 1 initially present. |
| ID24 | Segment overlaps isle 1 and partially fills second hole. Isle 1 and isle 2 initially present. No change in number of isles. Overlap 1. |
| ID25 | Segment overlaps isle 1 and completely fills second hole. Isle 1 and isle 2 initially present, reducing to one isle. Overlap 1. |
| ID26 | Segment overlaps isle 1, completely fills second hole, and partially overlaps isle 2. Isle 1 and isle 2 initially present, reducing to one isle. Overlap 12. |
| ID27 | Segment overlaps isle 1, completely fills second hole, and completely overlaps isle 2. Isle 1 and |

TABLE IV-continued

| ID | Classification Property |
|---|---|
| | isle 2 initially present, reducing to one isle. Overlap 12. |
| ID28 | Segment joins to end of isle 1, partly filling second hole. Isle 1 and isle 2 initially present. No change in number of isles. |
| ID29 | Segment joins to end of isle 1, exactly filling second hole. Isle 1 and isle 2 initially present, reducing to one isle. |
| ID30 | Segment joins to end of isle 1, filling second hole, and partly overlaps isle 2. Isle 1 and isle 2 initially present, reducing to one isle. Overlap 2. |
| ID31 | Segment joins to end of isle 1, filling second hole, and completely overlaps isle 2. Isle 1 and isle 2 initially present, reducing to one isle. Overlap 2. |
| ID32 | Segment discarded. A third isle would be generated in the second hole. Isle 1 and Isle 2 initially present. |
| ID33 | Segment generates second isle. Isle 1 initially present. |
| ID34 | Segment joins to beginning of isle 2, partly filling second hole. Isle 1 and isle 2 initially present. No change in number of isles. |
| ID35 | Segment partly fills second hole and partly overlaps isle 2. Isle 1 and isle 2 initially present. No change in number of isles. Overlap 2. |
| ID36 | Segment discarded. Segment overlaps isle 2. Isle 1 and Isle 2 initially present. |
| ID37 | Segment overlaps isle 2 and extends beyond isle 2. Isle 1 and Isle 2 initially present. No change in number of isles. Overlap 2. |
| ID38 | Segment discarded. A third isle would be generated beyond isle 2. Isle 1 and Isle 2 initially present. |
| ID39 | Segment joins to end of isle 2. Isle 1 and isle 2 initially present. No change in number of isles. |

Since incoming segments in Table IV are out-of-order segments, there is no code to increment rcv_adv for classifications in Table IV, since the reception window remains the same. Other reception parameters listed in Table II are updated, as shown in the respective code for each classification, according to the properties described in Table IV. For example, an incoming out-of-order segment corresponding to classification ID22 causes parameters for isle 1 to be taken from the beginning and end of the incoming segment since there is only one isle remaining (corresponding to the incoming segment). Parameters for isle 2 are set to rcv_adv.

Inspection of flowchart 190 illustrates that up to twelve sequential comparisons may have to be made in order to assign a classification to an incoming segment. For example, classification ID11 requires twelve sequential comparisons, classification ID35 requires nine sequential comparisons. It will be appreciated that because of the sequential nature of the flowchart, and the large number of comparisons that may have to be made, implementing flowchart 190 "as is" in software or hardware may require a relatively long time before an incoming segment is finally classified.

Rather than implementing flowchart 190 as is, the flowchart is "flattened." The flattening is implemented by performing a number of comparisons in parallel, most preferably in hardware, both processes considerably increasing the speed with which an incoming segment is classified and enabling receiver 61 to achieve a writing rate for processed segments which is substantially identical to a reception rate of the segments. Using the reception parameters listed in Table II and the parameters of the incoming segment, subtractions shown in Table V below are made. It will be understood that the result of each subtraction compares the two parameters of the respective subtraction, so that the subtractions are also referred to herein as comparisons. Table V also shows an arbitrary identification that is assigned to each comparison.

TABLE V

| Parameters Compared | Comparison Identification |
|---|---|
| seq_begin - rcv_nxt | A |
| seq_begin - isle1_strt | B |
| seq_begin - isle1_end | C |
| seq_begin - isle2_strt | D |
| seq_begin - isle2_end | E |
| seq_end - rcv_nxt | F |
| seq_end - isle1_strt | G |
| seq_end - isle1_end | H |
| seq_end - isle2_strt | I |
| seq_end - isle2_end | J |
| rcv_adv - isle1_strt | K |
| rcv_adv - isle2_strt | L |

It will be understood that the result of each comparison A, B, C, . . . J in Table V may be negative, zero, or positive. Comparisons K, L may be positive or zero.

The comparisons listed in Table V may be applied to the scenarios of FIGS. 4 and 5. Each scenario corresponds to a different classification ID of flowchart 190. The results of each of the comparisons, and the corresponding classification ID, are given in Table VI below.

TABLE VI

| Parameter Comparison | Comparison Results | | | | | | | | |
|---|---|---|---|---|---|---|---|---|---|
| Scenario (FIGS. 4, 5) | 94 | 96 | 98 | 100 | 102 | 140 | 142 | 144 | 148 |
| seq_begin - rcv_nxt | 0 | + | + | + | 0 | + | + | + | + |
| seq_begin-isle1_strt | − | − | + | + | − | + | + | + | + |
| seq_begin - isle1_end | − | − | 0 | + | − | + | − | + | − |
| seq_begin-isle2_strt | − | − | − | − | − | + | − | − | − |
| seq_begin - isle2_end | − | − | − | − | − | − | − | − | − |
| seq_end - rcv_nxt | − | − | − | − | − | − | − | − | − |
| seq_end - isle1_strt | − | − | + | + | 0 | + | + | + | + |
| seq_end - isle1_end | − | − | + | + | − | + | + | + | − |
| seq_end - isle2_strt | − | − | − | − | − | + | + | + | − |
| seq_end - isle2_end | − | − | − | − | − | + | − | + | − |
| rcv_adv - isle1_strt | 0 | 0 | + | + | + | + | + | + | + |
| rcv_adv - isle2_strt | 0 | 0 | 0 | 0 | + | + | + | + | + |
| Classification ID (FIGS. 6A- 6K) | 4 | 16 | 28 | 33 | 5 | 37 | 26 | 35 | 23 |

As is demonstrated in Table VI, each classification ID may be determined uniquely from the comparison results, so that there is a one-to-one mapping between comparison results and classification ID. Those skilled in the art will be able to determine the comparison results for classification IDs not shown in Table VI.

FIG. 7 is a flowchart 200 showing how the comparisons listed in Table V are used in order to obtain the classification ID for an incoming TCP/IP segment, according to a preferred embodiment of the present invention. In a storage step 202, a table of sets of comparison results for all expected classification IDs, and the respective IDs, is stored in memory 65 of receiver 61 (FIG. 3B). The table comprises entries substantially similar to those of Table VI. In a comparison step 204, comparisons substantially as listed in Table V are made in parallel with each other, using stored values of rcv_nxt, rcv_adv, isle1_strt, isle1_end, isle2_strt, and isle2_end, and values seq_begin and seq_end of the incoming segment.

In a mapping step 206, the comparison results are mapped to a respective classification ID, as illustrated in Table V, using the table stored in step 202. Most preferably, steps 204 and 206 are performed during sequential time periods determined by clock 69, so that step 206 immediately follows step 204. The time periods determined by clock 69 most preferably comprise a single clock cycle. Alternatively, each time period comprises two or more clock cycles.

In an implementation step 208, code for the classification found in step 206 is implemented. The code for each classification ID is substantially as given in flowchart 190. The code may be implemented by any method known in the art, and may be implemented in software, hardware, or a combination of software and hardware. For example, code for each classification ID may be written in sets of eight instructions, each set of instructions beginning at an address given by a jump instruction:

Jump to Base_address+(ID<<3).

Inspection of flowchart 190 shows that no classification ID comprises more than six lines of code, so that code for each classification ID may be written using eight instructions, with no-operation (NOP) commands being used to fill unused code space.

An incoming segment is stored in memory 65 (FIG. 3A) while process 200 is implemented. At the conclusion of the process, part or all of the segment is saved in memory 65, or the segment is discarded. Where an overlap occurs, receiver 61 has already received sequences comprised in the incoming segment, and so the corresponding part of the incoming segment is redundant, and is discarded from the memory.

When part or all of the incoming segment is saved, most preferably, rather than rewriting the saved sequences in the segment to reconstitute an original datagram, a link table 73 (FIG. 3A) is maintained in memory 65. The link table comprises links which point to positions of sequences of saved portions of incoming segments. The links are updated each time process 200 completes, according to the code comprised in the classification generated by the process, so that there is no need to rewrite saved sequences of the segment.

Link table 73 is utilized by receiver 61 when it outputs a final datagram, assembled from the saved portions of the incoming segments, from memory 65. It will be appreciated that using link table 73 enables memory 65 to act as an input and output buffer for receiver 61.

It will be appreciated that preferred embodiments of the present invention may be implemented for substantially any number of isles stored in the TCP/IP receiver. For example, if the receiver is implemented to store three isles, Table II includes a start and finish of the third isle, stored as isle3_strt and isle3_end. Flowchart 190 is modified accordingly. For example, classification ID14, wherein a received segment is discarded because the received segment generates a third isle, comprises code to enable generation of the third isle, and the segment is not discarded. Five further comparisons: seq_begin-isle3_strt, seq_begin-isle3_end, seq_end-isle3_strt, seq_end-isle3_end, and rcv_adv-isle3_strt, are made so as to check incoming segment parameters with respect to the third isle. Thus, Table V comprises 17 comparisons, and the comparison results may be mapped to classification IDs of modified flowchart 190, substantially as shown in the examples of Table V. (Because of the third isle, there will be more than 39 classification IDs for the incoming TCP/IP segment.)

Figure 2:
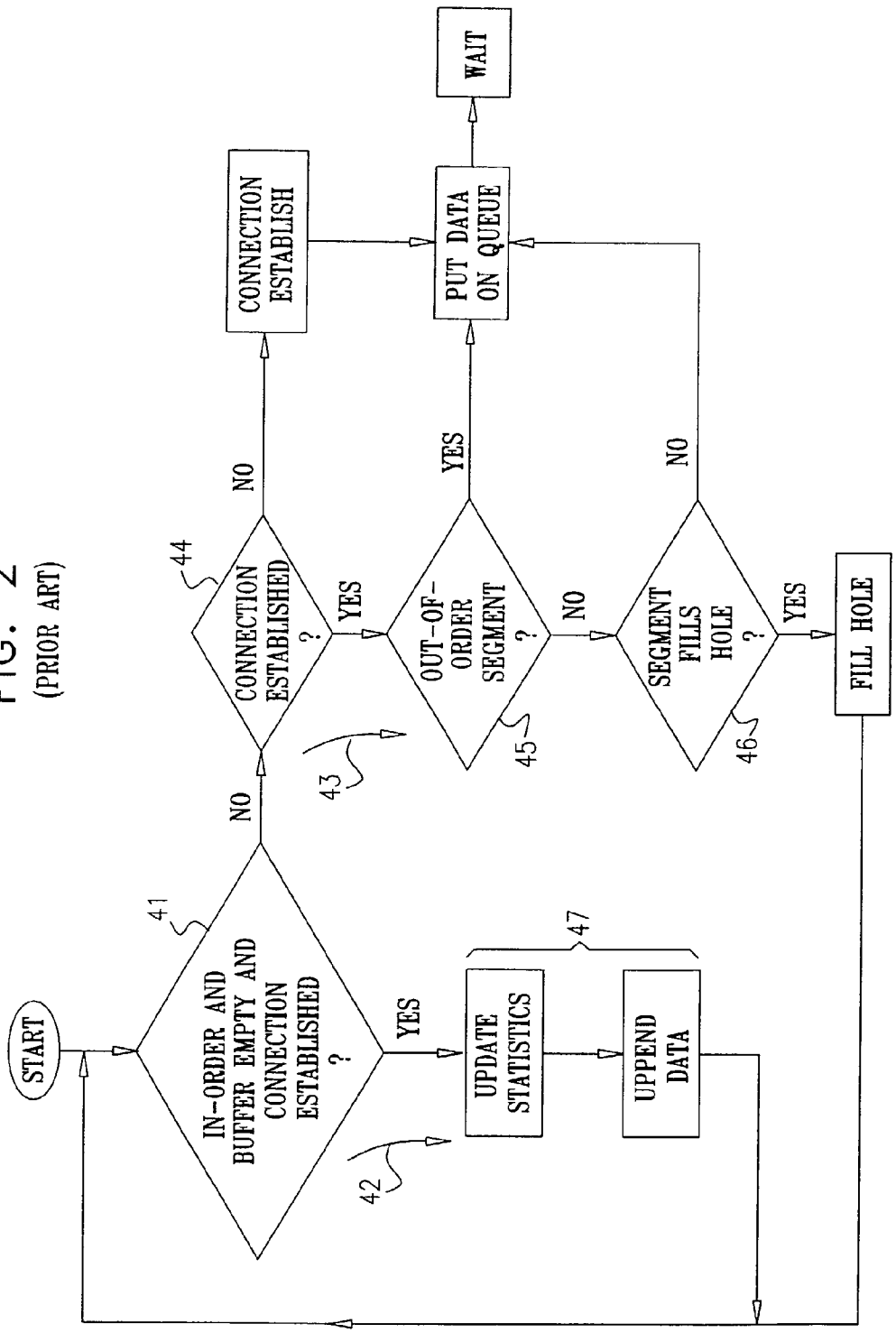
FIG. 2 is a flowchart showing processing of TCP/IP segments by a receiver, as is known in the art.

It will be understood that flowchart 200 (FIG. 7) remains generally unchanged regardless of the number of isles stored. Thus, in the case of three isles, step 204 comprises performing 17 comparisons, step 206 comprises mapping the result of the comparisons using the table of modified flowchart 190 stored in step 202, and step 208 comprises implementing the classification chosen in step 206. Thus, flowchart 200 enables efficient reordering of incoming out-of-order segments, as well as efficient disposition of incoming in-order segments, by using substantially the same process for both types of segments. It will be appreciated that the process enables receiver 61 to achieve a writing rate for disposition of the segments, regardless of whether they are in-order or to-of-order, which is substantially identical to a reception rate of the segments. This is in contrast to systems known in the art, such as that described with reference to FIG. 2.

It will be further understood that preferred embodiments of the present invention may be implemented for substantially any incoming in-order and out-of-order segments which are generated according to a digital transport protocol transmitting segments incorporating sequence values. Such transport protocols include, but are not limited to, TCP/IP.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing incoming data segments, the method comprising:
    receiving the data segments over a network in a reception order, wherein the data segments are transmitted in accordance with a transport protocol and wherein the segments incorporate sequence values indicative of a transmission order of the segments;
    for each segment received in the reception order, comparing the sequence values of the received segment and of the segments received earlier in the reception order in order to assign the received segment a classification identity as an in-order or out-of-order segment; and
    arranging the segments in the transmission order in an output buffer, by writing the segments to respective locations in the output buffer based on the classification identity of each segment, wherein comparing the sequence values of the received segment and of the segments received earlier in the reception order comprises generating a pre-determined mapping between received-segment classification identities, said received-segment classification identities comprising the classification identity, and expected sets of comparison results responsive to the sequence values.

2. The method according to claim 1, wherein the pre-determined mapping comprises a one-to-one mapping.

3. A method for processing incoming data segments, the method comprising:

receiving the data segments over a network in a reception order, wherein the data segments are transmitted in accordance with a transport protocol and wherein the segments incorporate sequence values indicative of a transmission order of the segments;

for each segment received in the reception order, comparing the sequence values of the received segment and of the segments received earlier in the reception order in order to assign the received segment a classification identity as an in-order or out-of-order segment;

arranging the segments in the transmission order in an output buffer, by writing the segments to respective locations in the output buffer based on the classification identity of each segment, wherein the segments received earlier in the reception order comprise one or more out-of-order segments; and generating a pre-determined mapping between the classification identity and an expected set of comparison results responsive to the sequence values.

4. A method for processing incoming data segments, the method comprising:

receiving the data segments over a network in a reception order, wherein the data segments are transmitted in accordance with a transport protocol and wherein the segments incorporate sequence values indicative of a transmission order of the segments;

for each segment received in the reception order, comparing the sequence values of the received segment and of the segments received earlier in the reception order in order to assign the received segment a classification identity as an in-order or out-of-order, wherein comparing the sequence values of the received segment and of the segments received earlier in the reception order comprises generating a pre-determined mapping between received-segment classification identities, said received-segment classification identities comprising the classification identity, and expected sets of comparison results responsive to the sequence values; and arranging the segments in the transmission order in an output buffer, by writing the segments to respective locations in the output buffer based on the classification identity of each segment, wherein the classification identity comprises instructions responsive to the sequence values of the received segment and of the segments received earlier in the reception order, and wherein writing the segments comprises implementing the instructions so as to correctly locate the received segment in the output buffer.

5. A system for processing incoming data segments, the system comprising:

at least one processor that enables receiving of the data segments over a network in a reception order, wherein the data segments are transmitted in accordance with a transport protocol and wherein the segments incorporate sequence values indicative of a transmission order of the segments;

said at least one processor enables comparing, for each segment received in the reception order, the sequence values of the received segment and of the segments received earlier in the reception order in order to assign the received segment a classification identity as an in-order or out-of-order segment; and said at least one processor enables arranging the segments in the transmission order in an output buffer, by writing the segments to respective locations in the output buffer based on the classification identity of each segment, wherein said at least one processor enables generation of a pre-determined mapping between received-segment classification identities, comprising the classification identity, and expected sets of comparison results responsive to the sequence values, and storing the mapping in the memory.

6. The system according to claim 5, wherein the pre-determined mapping comprises a one-to-one mapping.

7. A system for processing incoming data segments, the system comprising:

at least one processor that enables receiving of the data segments over a network in a reception order, wherein the data segments are transmitted in accordance with a transport protocol and wherein the segments incorporate sequence values indicative of a transmission order of the segments;

said at least one processor enables comparing, for each segment received in the reception order, the sequence values of the received segment and of the segments received earlier in the reception order in order to assign the received segment a classification identity as an in-order or out-of-order segment; and said at least one processor enables arranging the segments in the transmission order in an output buffer, by writing the segments to respective locations in the output buffer based on the classification identity of each segment, wherein the segments received earlier in the reception order comprise one or more out-of-order segments, and wherein the processor is to generate a pre-determined mapping between the classification identity and an expected set of comparison results responsive to the sequence values.

8. A system for processing incoming data segments, the system comprising:

at least one processor that enables receiving of the data segments over a network in a reception order, wherein the data segments are transmitted in accordance with a transport protocol and wherein the segments incorporate sequence values indicative of a transmission order of the segments;

said at least one processor enables comparing, for each segment received in the reception order, the sequence values of the received segment and of the segments received earlier in the reception order in order to assign the received segment a classification identity as an in-order or out-of-order, wherein comparing the sequence values of the received segment and of the segments received earlier in the reception order comprises generating a pre-determined mapping between received-segment classification identities, said received-segment classification identities comprising the classification identity, and expected sets of comparison results responsive to the sequence values; and said at least one processor enables arranging the segments in the transmission order in an output buffer, by writing the segments to respective locations in the output buffer based on the classification identity of each segment, wherein the classification identity comprises instructions responsive to the sequence values of the received segment and of the segments received earlier in the reception order, and wherein writing the segments comprises implementing the instructions so as to correctly locate the received segment in the output buffer.

\* \* \* \* \*